United States Patent
Baba et al.

(10) Patent No.: US 9,555,486 B2
(45) Date of Patent: Jan. 31, 2017

(54) MULTI-FLUTE ENDMILL

(71) Applicant: MITSUBISHI HITACHI TOOL ENGINEERING, LTD., Tokyo (JP)

(72) Inventors: Makoto Baba, Yasu (JP); Jun-ichi Hirai, Hitachi (JP)

(73) Assignee: MITSUBISHI HITACHI TOOL ENGINEERING, LTD., Tokyo (JP)

( * ) Notice: Subject to any disclaimer, the term of this patent is extended or adjusted under 35 U.S.C. 154(b) by 143 days.

(21) Appl. No.: 14/416,710

(22) PCT Filed: Jul. 25, 2013

(86) PCT No.: PCT/JP2013/070147
§ 371 (c)(1),
(2) Date: Jan. 23, 2015

(87) PCT Pub. No.: WO2014/017576
PCT Pub. Date: Jan. 30, 2014

(65) Prior Publication Data
US 2015/0174672 A1 Jun. 25, 2015

(30) Foreign Application Priority Data
Jul. 27, 2012 (JP) .................. 2012-166975

(51) Int. Cl.
*B23C 5/10* (2006.01)
*B23C 5/00* (2006.01)

(52) U.S. Cl.
CPC .......... *B23C 5/10* (2013.01); *B23C 2210/082* (2013.01); *B23C 2210/321* (2013.01);
(Continued)

(58) Field of Classification Search
CPC ............... B23C 5/10; B23C 5/12; B23C 5/14; B23C 2210/04; B23C 2210/0421; B23C 2210/0422; B23C 2210/082; B23C 2210/204; B23C 2210/048; B23C 2210/04; B23B 2251/40
See application file for complete search history.

(56) References Cited

U.S. PATENT DOCUMENTS 8,647,025 B2 *  2/2014  Davis ................. B23C 5/10
                                              407/119
2003/0180104 A1 *  9/2003  Kuroda .............. B23C 5/10
                                              407/54
(Continued)

FOREIGN PATENT DOCUMENTS

DE  20 2009 013 808 U1   3/2010
EP       1 348 508 A1   10/2003
(Continued)

OTHER PUBLICATIONS

International Search Report mailed Sep. 17, 2013, in corresponding International Patent Application No. PCT/JP2013/070147.
(Continued)

*Primary Examiner* — Will Fridie, Jr.

(57) ABSTRACT

Multi-flute endmill having a cutting edge rake face formed from a side of a rotation axis to a peripheral side in a radial direction, and having an end cutting edge rake face. A peripheral cutting edge rake face adjacent to the end cutting edge rake face forms a face different from the end cutting edge rake face and serves as the rake face of a corner edge. An intersection between a convex ridge line is located in a boundary between the rake faces of the end cutting edge and peripheral cutting edge. A convex ridge line is located in a boundary between the end cutting edge rake face and a bottom surface of the flute is moved into the side of the rotation axis in the radial direction with respect to a boundary between the flank face of a corner edge and the flank face of the end cutting edge.

8 Claims, 12 Drawing Sheets

(52) U.S. Cl.
CPC ...... *B23C 2210/40* (2013.01); *B23C 2210/44* (2013.01); *B23C 2210/48* (2013.01); *B23C 2210/54* (2013.01); *B23C 2250/12* (2013.01); *Y10T 407/1948* (2015.01)

(56) References Cited

U.S. PATENT DOCUMENTS

| | | | | |
|---|---|---|---|---|
| 2009/0185878 A1* | 7/2009 | Turrini | ...................... | B23C 5/10 409/132 |
| 2014/0133926 A1* | 5/2014 | Budda | .................. | B23C 5/1009 407/54 |
| 2015/0290724 A1* | 10/2015 | Sharivker | ................ | B23C 5/10 407/54 |
| 2016/0001382 A1* | 1/2016 | Takahashi | ................ | B23C 5/10 407/54 |
| 2016/0271706 A1* | 9/2016 | Palmer | ...................... | B23C 5/10 |

FOREIGN PATENT DOCUMENTS

| | | |
|---|---|---|
| EP | 1 591 183 A1 | 11/2005 |
| EP | 2 799 172 A1 | 11/2014 |
| JP | 2007-30074 | 2/2007 |
| JP | 2007-75992 | 3/2007 |
| JP | 2008-110472 | 5/2008 |
| JP | 2010-167520 | 8/2010 |

OTHER PUBLICATIONS

Extended European Search Report dated Feb. 23, 2016 in corresponding European Patent Application No. 13823001.6.

\* cited by examiner (a)

(b)

(a)

(b)

MULTI-FLUTE ENDMILL

CROSS-REFERENCE TO RELATED APPLICATIONS

This application is a U.S. National Stage Application, which claims the benefit under 35 U.S.C. §371, of PCT International Patent Application No. PCT/JP2013/070147, filed Jul. 25, 2013, which is based on and claims the foreign priority benefit under 35 U.S.C. §119, of Japanese Patent Application No. 2012-166975, filed Jul. 27, 2012, the entire disclosures of which are herein incorporated by reference as a part of this application.

TECHNICAL FIELD

The present invention relates to a multi-flute endmill that is fitted to a 3-axis or 5-axis controlled machine tool when a thin-walled impeller or blade used in a rotating machine device such as a turbine or a supercharger is manufactured with the machine tool by cutting processing and that is improved such that high-feed cutting processing can be performed on a member such as an impeller.

BACKGROUND ART

A thin-walled impeller (bladed wheel), blade or the like used in a rotating machine device such as a turbine or a supercharger is manufactured through the following cutting processing steps: a difficult-to-cut alloy member (raw material) made of a Ni-based heat-resistant alloy, a stainless steel or a titanium alloy is fixed onto the rotation axis of a machine tool, then multi-axis control is performed while a cutting tool such as an endmill is being rotated and rough processing, semi-finish processing and finish processing are performed on this alloy member.

Since in the finish processing of the cutting processing steps, it is necessary to perform the finish processing such that the surface of the alloy member is curved, a ball endmill, a taper ball endmill or a radius endmill having a cutting edge formed with a peripheral cutting edge, a corner edge and a end cutting edge is conventionally used. In particular, a solid-type radius endmill (hereinafter also referred to as a "multi-flute endmill") that has a large number of cutting edges at the tip of the main body of the tool, for example, six or more cutting edges is gradually used.

As a conventional technology on a multi-flute endmill, there is a form in which as shown in FIG. 11, a large number of cutting edges are provided, and between the adjacent cutting edges in the rotation direction R (peripheral direction) of the endmill, a gash 7 close to the center in the radial direction (rotation axis) and a flute 8 close to the periphery are provided so as to discharge chips (see Patent Document 1). FIG. 11 specifically shows an example shown in FIG. 8 of Patent Document 1.

It is thought that in the example (Patent Document 1) shown in FIG. 11, the flute 8 is formed on the backward side in the rotation direction R on the peripheral side in the radial direction of the gash 7 formed on the forward side in the rotation direction R of the end cutting edge 6, the flutes 8 are continuously formed on the gashes 7, and thus chips are unlikely to be stayed on the gashes 7, with the result that the effect of enhancing the discharge of the chips cut by the end cutting edge 6 is obtained.

An example of the endmill, other than Patent Document 1, in which the flute is formed close to the periphery in the radial direction of the gash formed close to the center in the radial direction is shown in FIG. 12 (see Patent Document 2). FIG. 12 shows FIG. 2 in Patent Document 2. In this example, chip discharge grooves 4 corresponding to the flutes in Patent Document 1 are formed continuously close to the periphery in the radial direction of the gash 7, and between the chip discharge groove 4 and the gash 7, a concave portion 10 forming the rake face 11 of a corner edge 12 is formed (paragraphs [0017] and [0018]), with the result that the gash 7 and the chip discharge groove 4 communicate with each other through the concave portion 10.

In Patent Document 2, the corner edge 12 in the shape of a segment is formed up to the start point Q of a end cutting edge 9 on the center side in the radial direction beyond the tip P of the segment, and an intersection line L that is formed from the start point Q to the back end portion side of the endmill and that partitions the concave portion 10 is located on the center side in the radial direction with respect to a straight line parallel to a center axis passing through the tip P, so that it is possible to discharge chips produced by the corner edge 12 from the rake face 11 of the cutting edge without the chips being passed around to the rake face 8 of the end cutting edge (paragraphs [0019]-[0024]).

RELATED ART DOCUMENT

Patent Document

Patent Document 1: German Patent Publication No. DE 20 2009 013 808 U1 (FIG. 8)
Patent Document 2: Japanese Unexamined Patent Application Publication No. 2010-167520 (claim 1, paragraphs [0016]-[0024] and FIGS. 1 and 2)

DISCLOSURE OF THE INVENTION

Problems to be Solved by the Invention

In the example (Patent document 1) of FIG. 11, the inclination of the bottom surface of the gash 7 from the center side in the radial direction (rotation axis) to the peripheral side with respect to the radial direction is gentle, and is substantially parallel to the end surface of the endmill, so that the effect of discharging the chips from the gash 7 cannot be significantly expected. It is thought that since the flute 8 continuous to the gash 7 is formed to be displaced to the periphery in the radial direction, the guiding effect from the gash 7 to the flute 8 also cannot be expected.

In the example of FIG. 11, since the rake face 4a of a peripheral cutting edge 4 also serves as the rake face of a corner R edge 5, as compared with a case where it does not serve as rake face of the corner R edge 5, as indicated by the solid lines of FIG. 7(b), it is possible to somewhat increase the volume of the flute 8 (chip pocket). However, since the flute 8 is formed to be displaced to the periphery in the radial direction, the advantage of increasing the volume of the flute 8 is not utilized. The chip pocket (CP) is the sum of the volume of the gash and the volume of the flute, and it is said that as the volume is increased, the chip storing function and the chip discharge effect are enhanced. In FIG. 7(b), solid lines indicate a cross section when the rake face 4a of the peripheral cutting edge 4 also serves as the rake face of the corner R edge 5, and two-dot chain lines indicate a cross section when the rake face 4a of the peripheral cutting edge 4 does not serve as the rake face of the corner R edge 5.

In Patent Document 2, in order to prevent the chips produced by the corner edge 12 from being passed around to the side of the gash 7, a raised wall surface 13 is formed on the surface on the side of the gash 7 of the concave portion 10 present between the gash 7 and the chip discharge groove 4 (paragraph [0019]). Hence, the end cutting edge 9 is formed, and the effect discharging the chips dropped into the gash 7 to the chip discharge groove 4 is likely to be reduced by the concave portion 10, with the result that it is thought that it is impossible to obtain the effect of guiding the chips from the interior of the gash 7 to the chip discharge groove 4.

Under the conditions described above, the present invention proposes a multi-flute endmill that significantly enhances, as compared with the example of Patent Document 1, the chip discharge effect and the guiding effect to the flute from the gash.

Conventionally, when a 3-axis or 5-axis NC controlled machine tool is used to perform high-feed cutting processing at high speed on the surface of the above-described impeller having a curved surface, it is difficult to discharge the produced chips from the endmill for a short period of time, with the result that the cutting processing is likely to be prevented. Under the conditions described above, it is required to develop a multi-flute endmill that can perform high-feed cutting processing at high speed on the surface of the impeller. The same is true for a case where a difficult-to-cut alloy member such as a blade is a target.

In view of the foregoing, a basic object of the present invention is to provide a multi-flute radius endmill in which even when high-feed cutting processing is performed on a difficult-to-cut alloy member, the discharge of chips described above is satisfactory and the structure of a cutting edge is improved.

Specifically, an object of the present invention is to use a multi-flute radius endmill (multi-flute endmill) fitted to a 3-axis or 5-axis NC machine tool to perform conventionally difficult high-feed finish cutting processing, with one multi-flute endmill, on the surface of a difficult-to-cut alloy member such as an impeller formed with a thin-walled member of a difficult-to-cut alloy and having a curved surface, highly efficiently (high-speed processing) for a long period of time as compared with a conventional method. An object of the present invention is also to satisfactorily discharge produced chips even when high-feed cutting processing is performed.

The "multi-flute" refers to a radius endmill, as shown in FIGS. 1 and 2, having a plurality of cutting edges 3, particularly six or more cutting edges 3, that are formed with the end cutting edge 6, the corner R edge 5 continuous to the end cutting edge 6 and the peripheral cutting edge 4 continuous to the corner R edge 5 from the side of the rotation axis O (the center side in the radial direction) of the tip of the main body of the tool (multi-flute endmill) to the peripheral side in the radial direction of a shank 2*a*.

Means for Solving the Problem

A multi-flute endmill according to claim 1 includes: a cutting edge part that has a plurality of cutting edges, each formed with a end cutting edge which is formed at a tip of a shank from a side of a rotation axis O to a peripheral side in a radius direction of the shank, a corner R edge continuous to the end cutting edge and a peripheral cutting edge continuous to the corner R edge; and a gash and a flute that are respectively formed on a center side and the peripheral side in the radial direction between the adjacent cutting edges in a rotation direction R around the rotation axis O, where a rake face of the cutting edge is formed, from the center side to the peripheral side in the radial direction, with a rake face of the end cutting edge, and a rake face of the peripheral cutting edge that is adjacent to the rake face of the end cutting edge, that forms a face different from the rake face of the end cutting edge and that also serves as a rake face of the corner R edge, a flank face of the cutting edge is formed, from the center side to the peripheral side in the radial direction, with a flank face of the end cutting edge, a flank face of the corner R edge adjacent to the flank face of the end cutting edge, and a flank face of the peripheral cutting edge adjacent to the flank face of the corner R edge, the flute is formed with the rake face of the peripheral cutting edge, a flute face opposite the rake face of the peripheral cutting edge on a forward side in the rotation direction R, and a bottom surface formed in a boundary between the rake face of the peripheral cutting edge and the flute face and an intersection between a convex ridge line located in a boundary between the rake face of the end cutting edge and the rake face of the peripheral cutting edge and a convex ridge line located in a boundary between the rake face of the end cutting edge and a bottom surface of the flute is moved in to the center side in the radial direction with respect to a boundary between a flank face of the corner R edge and a flank face of the end cutting edge.

The "radial direction" in claim 1 refers to a radial direction passing through the rotation axis O on a cross section intersecting the rotation axis O, and when the cutting edge part 2*b* is seen from the side of the tip of the shankshank 2*a*, that is, the side of the tip 1*a* of the multi-flute endmill 1 to the side of the shank 2*a*, the gash 7 is formed close to the rotation axis O (the center) in the radial direction between the flank faces 6*b* of the adjacent end cutting edges 6 in the rotation direction R. The flute 8 is formed between the flank faces 5*b* of the adjacent corner R edges 5 in the rotation direction R on the peripheral side in the radial direction. The "tip of the shank 2*a*" is synonymous with the "tip 1*a* of the multi-flute endmill 1".

"The rake face 4*a* of the peripheral cutting edge 4 forms a face different from the rake face 6*a* of the end cutting edge 6" refers to the fact that the rake face 4*a* of the peripheral cutting edge 4 and the rake face 6*a* of the end cutting edge 6 are not within the same face. "The rake face 4*a* of the peripheral cutting edge 4 also serves as the rake face of the corner R edge 5" refers to the fact that the rake face 4*a* of the peripheral cutting edge 4 is formed to straddle from the peripheral cutting edge 4 to the corner R edge 5, and as described later, the rake face 4*a* of the peripheral cutting edge 4 straddles from the peripheral cutting edge 4 to the end cutting edge 6.

The flute 8 is formed with the rake face 4*a* of the peripheral cutting edge 4 and the flute face 8*a* opposite the rake face 4*a* on the forward side in the rotation direction R of the multi-flute endmill 1, and in the boundary between the rake face 4*a* of the peripheral cutting edge 4 and the flute face 8*a*, the bottom surface 8*b* forming the bottom of the flute 8 is formed (claim 3). The bottom surface 8*b* has a width in the rotation direction R (the peripheral direction of the multi-flute endmill 1), and as shown in FIG. 5, between the bottom surface 8*b* and the rake face 4*a* of the peripheral cutting edge 4 on both sides in the width direction (the rotation direction R), the boundary line 10*a* is formed, and the boundary line 10*b* is formed between the bottom surface 8*b* and the flute face 8*a*. Each of the boundary line 10*a* and the boundary line 10*b* forms a concave ridge line. When the multi-flute endmill 1 is seen from the peripheral side in the radial direction to the center side, the bottom surface 8*b* may be formed in the shape of a curved surface convex downwardly or the letter V or the like or formed in the shape of a flat surface.

"The convex ridge line 64 located in the boundary between the rake face 6*a* of the end cutting edge 6 and the rake face 4*a* of the peripheral cutting edge 4" refers to, as shown in FIGS. 5 and 6, the ridge line that branches to the side of the gash face 7*a* (the side of the rake face 6*a* of the end cutting edge 6) facing the end cutting edge 6 when the convex ridge line forming the corner R edge 5 and the end cutting edge 6 continuous in the radial direction is moved from the corner R edge 5 to the end cutting edge 6. The ridge line 64 branches to the gash face 7*a* from the vicinity of the boundary between the flank face 5*b* of the corner R edge 5 and the flank face 6*b* of the end cutting edge 6, and forms the boundary line between the rake face 6*a* of the end cutting edge 6 and the rake face 4*a* of the peripheral cutting edge 4.

"The convex ridge line 68 located in the boundary between the rake face 6*a* of the end cutting edge 6 and the bottom surface 8*b* of the flute 8" refers to the ridge line that is present on the extension of the boundary line 10*b* between the bottom surface 8*b* of the flute 8 and the flute face 8*a* and that extends from the boundary line 10*b* to the end cutting edge 6 (the side of the rake face 6*a* of the end cutting edge 6) facing the gash 7. The ridge line 68 forms the boundary line between the rake face 6*a* of the end cutting edge 6 and the bottom surface 8*b* of the flute 8. The ridge line 68 extends from the position where the flute face 8*a* opposite the rake face 4*a* of the peripheral cutting edge 4 on the forward side in the rotation direction R and the bottom surface 7*b* of the gash 7 intersect each other to the side of the end cutting edge 6 and intersects the ridge line 64. The bottom surface 7*b* of the gash 7 is formed in the boundary between the rake face 6*a* of the end cutting edge 6 and the gash face 7*a* opposite the rake face 6*a* on the forward side in the rotation direction R (claim 2).

The ridge line 64 branches from the corner R edge 5 to the side of the gash face 7*a* in order to partition (divide) the rake face 4*a* of the peripheral cutting edge 4 from the rake face 6*a* of the end cutting edge 6, and thereby as shown in FIGS. 5 and 6, makes the rake face 4*a* of the peripheral cutting edge 4 move (bite) in to the side of the rake face 6*a* of the end cutting edge 6. Likewise, the ridge line 68 extends from the boundary line 10*b* to the side of the end cutting edge 6 in order to partition (divide) the bottom surface 8*b* of the flute 8 from the rake face 6*a* of the end cutting edge 6, and thereby makes the bottom surface 8*b* of the flute 8 move (bite) in to the side of the rake face 6*a* of the end cutting edge 6.

Since the rake face 4*a* of the peripheral cutting edge 4 and the bottom surface 8*b* of the flute 8 form the flute 8, both the rake face 4*a* of the peripheral cutting edge 4 and the bottom surface 8*b* of the flute 8 are moved in to the side of the rake face 6*a* of the end cutting edge 6, and thus the effect of inducing the drop of the chips present within the gash 7 into the flute 8 is produced, with the result that the discharge of the chips from the interior of the gash 7 is enhanced.

"The intersection 66 between the convex ridge line 64 located in the boundary between the rake face 6*a* of the end cutting edge 6 and the rake face 4*a* of the peripheral cutting edge 4 and the convex ridge line 68 located in the boundary between the rake face 6*a* of the end cutting edge 6 and the bottom surface 8*b* of the flute 8 is moved in to the side of the rotation axis O in the radial direction with respect to the boundary between the flank face 5*b* of the corner R edge 5 and the flank face 6*b* of the end cutting edge 6" refers to the fact that as shown in FIGS. 3 and 6, when the cutting edge part 2*b* is seen from the side of the tip 1*a* of the shank 2*a* (the multi-flute endmill 1) in the direction of the rotation axis O, the intersection 66 between the ridge line 64 and the ridge line 68 is moved in to the side of the rotation axis O in the radial direction with respect to the boundary (boundary line) between the flank face 5*b* of the corner R edge 5 and the flank face 6*b* of the end cutting edge 6. In FIGS. 3 and 9, broken lines approaching the corner R edge 5 and the end cutting edge 6 represent the convex ridge line 64.

Although in FIG. 5 and the like, between the flank face 6*b* of the end cutting edge 6 and the flank face 5*b* of the corner R edge 5 adjacent in the radial direction and between the flank face 5*b* of the corner R edge 5 and the flank face 4*b* of the peripheral cutting edge 4, a line representing the boundary is shown, this line may be practically invisible. For example, in a case where in the flank face 6*b* of the end cutting edge 6 and the flank face 5*b* of the corner R edge 5 adjacent to each other and the flank face 5*b* of the corner R edge 5 and the flank face 4*b* of the peripheral cutting edge 4, as with a clothoid curve when the flank face 5*b* of the corner R edge 5 is seen in the in-plane direction (peripheral direction), the curvature of the adjacent curved surface (including the flat surface) is gradually changed, the boundary line is invisible. In the part where the curvature is changed, the boundary line may be visible.

"The intersection 66 between the ridge line 64 and the ridge line 68 is moved in to the side of the rotation axis O in the radial direction of the shank 2*a* with respect to the boundary between the flank face 6*b* of the end cutting edge 6 and the flank face 5*b* of the corner R edge 5" refers to the fact that the intersection 66 between the ridge line 64 and the ridge line 68 is located on the side of the rotation axis O with respect to the boundary between the flank face 5*b* of the corner R edge 5 and the flank face 6*b* of the end cutting edge 6, that is, the ridge line 64 and the ridge line 68 form lines which extend to the side of the center (the rotation axis O) from the peripheral side in the radial direction to intersect each other.

Since the intersection 66 between the ridge line 64 and the ridge line 68 is moved in to the side of the rotation axis O in the radial direction of the shank 2*a* with respect to the boundary between the flank face 6*b* and the flank face 5*b*, and thus when the multi-flute endmill 1 is seen from the side of the tip 1*a*, the flute 8 is formed so as to straddle from the corner R edge 5 to the end cutting edge 6, from the peripheral side in the radial direction to the center side (the side of the rotation axis O), as described above, it is possible to obtain the effect of guiding the chips from the gash 7 to the flute 8. At the same time, as indicated by solid lines in FIG. 7(*b*), the rake face 4*a* of the peripheral cutting edge 4 also serves as the rake face of the corner R edge 5 to advantageously acquire the volume of the flute 8, and thus it is possible to increase the volume of the flute 8, that is, the volume of the chip pocket (CP). The increase in the volume of the flute 8 means the enhancement of the ability to store chips and the discharge effect. The chip pocket (CP) refers to the sum of the volume of the space forming the gash 7 and the volume of the space forming the flute 8.

The flute 8 is formed so as to straddle from the corner R edge 5 to the end cutting edge 6, from the peripheral side in the radial direction to the center side (the side of the rotation axis O), and thus the rake face 4*a* of the peripheral cutting edge 4 also serves as the rake face of the corner R edge 5 to advantageously acquire the volume of the flute 8 (chip pocket). The reason why the rake face 4*a* of the peripheral cutting edge 4 also serves as the rake face of the corner R edge 5 to increase the volume of the flute 8 is that as described above, as shown in FIG. 7(b), when seen in a cross section perpendicular to the corner R edge 5, since the flank face 5b of the corner R edge 5 and the bottom surface 8b of the flute 8 intersect each other only in a single flat surface or the rake face 4a of a curved surface, as compared with a case where the rake face of the corner R edge 5 indicated by two-dot chain lines is present, a volume protruding to the side of the flute 8 is not present. FIG. 7(b) shows a cross section taken along line z-z in FIG. 5.

Since that the rake face 4a of the peripheral cutting edge 4 also serves as the rake face of the corner R edge 5 means that the rake face of the corner R edge 5 is not formed, it also means that the burden of the processing in the formation (the cutting processing) of the entire rake face of the cutting edge 3 including the rake face 4a of the peripheral cutting edge 4 is reduced, and thus it is possible to advantageously enhance the processing on the entire rake face of the cutting edge 3.

When the rake face 5a of the corner R edge 5 is formed, as shown in FIG. 7(b), on the straight line intersecting the corner R edge 5 and the boundary line 10a on the side of the flute 8, a protrusion portion indicated by the hatching of two-dot chain lines is formed. On the other hand, since in claim 1, the rake face 4a of the peripheral cutting edge 4 also serves as the rake face of the corner R edge 5 to prevent the hatched protrusion portion from being formed, the volume of the flute 8 (chip pocket) is increased only by the protrusion portion when the rake face 5a is present.

The intersection 66 between the ridge line 64 and the ridge line 68 is moved in to the side of the rotation axis O in the radial direction of the shank 2a with respect to the boundary between the flank face 6b of the end cutting edge 6 and the flank face 5b of the corner R edge 5, with the result that the rake face 4a of the peripheral cutting edge 4 is located relatively on the backward side in the rotation direction R with respect to the rake face 6a of the end cutting edge 6. The rake face 4a is located on the backward side in the rotation direction R with respect to the rake face 6a, and thus the chips present within the gash 7 are easily moved into the flute 8 as the multi-flute endmill 1 is rotated, the chips within the flute 8 are easily discharged to the outside of the multi-flute endmill 1, with the result that (due to the fact that the rake face 4a is located on the backward side in the rotation direction R of the rake face 6a) the discharge of the chips from the gash 7 and the flute 8 is enhanced.

As described above, the bottom surface 8b of the flute 8 has a width in the rotation direction R, and the bottom surface 8b has a width, and thus as compared with the case where the bottom surface 8b has no width, the effect of reducing the leaving of chips dropped directly from any of the cutting edges 3 such as the end cutting edge 6 and the corner R edge 5 or from the gash 7 into the flute 8 is obtained. Likewise, in order to enhance the discharge of the chips dropped into the gash 7, a width in the rotation direction R is also given to the bottom surface 7b of the gash 7. In this case, each of the bottom surfaces 7b and 8b of the gash 7 and the flute 8 has a width, and when chips are left within the flute 8, the discharge of the chips from the interior of the gash 7 may be inhibited. Hence, since in order to enhance the efficiency of discharging the chips present within the gash 7 to the flute 8, it is necessary to satisfactorily discharge chips at the discharge destination from the gash 7, it is appropriate that the width of the bottom surface 8b of the flute 8 is relatively greater than that of the bottom surface 7b of the gash 7 (claim 2).

Although even in the example shown in FIG. 11, the bottom surface 7b of the gash 7 and the bottom surface 8b of the flute 8 have a width, since in this example, the width of the bottom surface 8b of the flute 8 is relatively smaller than that of the bottom surface 7b of the gash 7, when the chips are left within the flute 8, the discharge of the chips from the gash 7 may be inhibited or the discharge may be stopped. On the other hand, when the width of bottom surface 8b of the flute 8 is greater than that of the bottom surface 7b of the gash 7 (in claim 2), since the chips within the flute 8 are unlikely to be left, the probability that the discharge of the chips from the gash 7 is inhibited and the probability that the discharge is stopped are lowered.

Since as shown in FIGS. 2 and 10, the flank face 4b of the peripheral cutting edge 4 is adjacent to the surface 2c of the shank 2a and forms a surface continuous to the surface 2c, "the intersection 66 between the ridge line 64 and the ridge line 68 is moved in to the center side in the radial direction with respect to the boundary between the flank face 6b and the flank face 5b" can also be said that "the rake face 4a of the peripheral cutting edge 4 straddles from the flank face 6b of the end cutting edge 6 to the surface 2c of the shank 2a". The rake face 4a of the peripheral cutting edge 4 straddles from the flank face 6b of the end cutting edge 6 to the surface 2c of the shank 2a, and thus e is charge of the chips from the gash 7 through the flute 8 to the outside of the multi-flute endmill 1 and the discharge speed are enhanced.

Claim 1 has the requirement "the intersection 66 between the convex ridge line 64 in the boundary between the rake face 6a of the end cutting edge 6 and the rake face 4a of the peripheral cutting edge 4 and the convex ridge line 68 in the boundary between the rake face 6a of the end cutting edge 6 and the bottom surface 8b of the flute 8 is moved in to the side of the rotation axis O with respect to the boundary between the flank face 6b of the end cutting edge 6 and the flank face 5b of the corner R edge 5", with the result that the chips produced by the end cutting edge 6 are divided into those which are dropped through the gash 7 into the flute 8 and those which are directly dropped into the flute 8. Hence, the chips are unlikely to be left within the gash 7, and the effect of discharging the chips from the gash 7 and the effect of guiding the chips from the gash 7 to the flute 8 are achieved.

As described above, on both sides in the width direction of the bottom surface 8b of the flute 8, the boundary line 10a with the rake face 4a of the peripheral cutting edge 4 and the boundary line 10b with the flute face 8a are formed as the concave ridge line. Here, in particular, as shown in FIG. 5, when the boundary line 10a between the bottom surface 8b and the rake face 4a of the peripheral cutting edge 4 passes through the intersection 66 between the convex ridge line 64 in the boundary between the rake face 6a and the rake face 4a and the convex ridge line 68 in the boundary between the rake face 6a and the bottom surface 8b (claim 3), since the rake face 4a of the peripheral cutting edge 4 and the bottom surface 8b of the flute 8 form a valley, the chips present within the gash 7 are easily to be dropped into the flute 8, with the result that the effect of guiding the chips from the gash 7 to the flute 8 is further enhanced.

The volume of the space of the flute 8 formed by the rake face 4a of the peripheral cutting edge 4 and the flute face 8a opposite this rake face 4a on the forward side in the rotation direction R is further increased because the flute face 8a has at least two surfaces, the internal surface 81a in contact with the bottom surface 7b of the gash 7 on the backward side in the rotation direction R and the external surface 82a forming a surface different form the internal surface 81a and in contact with the gash face 7a in the radial direction (claim 4). The gash face 7a is a surface opposite the rake face 6a of the end cutting edge 6 on the forward side in the rotation direction R. As shown in FIG. 8, the external surface 82a in this case is inclined with respect to the internal surface 81a from the side of the shank 2a of the multi-flute endmill 1 to the side of the tip 1a, from the backward side in the rotation direction R to the forward side, or is inclined from the center side in the radial direction to the peripheral side, from the backward side in the rotation direction R to the forward side, so that the convex ridge line appears as the boundary line 88 between the internal surface 81a and the external surface 82a. The phrase "has at least two surfaces" refers to the fact that the flute face 8a may have three or more surfaces.

"The external surface 82a is inclined from the side of the shank 2a of the multi-flute endmill 1 to the side of the tip 1a, from the backward side in the rotation direction R to the forward side" describes the condition of the inclination of the external surface 82a when the multi-flute endmill 1 is seen from the side surface to the center side in the radial direction. "The external surface 82a is inclined from the center side in the radial direction to the peripheral side, from the backward side in the rotation direction R to the forward side" describes the condition of the inclination of the external surface 82a when the multi-flute endmill 1 is seen from the side of the tip 1a to the side of the shank 2a.

"The internal surface 81a is in contact with the bottom surface 7b of the gash 7 on the backward side in the rotation direction R" refers to the fact that the bottom surface 7b and the internal surface 81a are adjacent through the boundary line located on the extension of the convex ridge line 68 and branching from the boundary line 10b, and that the internal surface 81a is located relatively on the backward side in the rotation direction R with respect to the bottom surface 7b. Since the boundary line between the bottom surface 7b and the internal surface 81a forms part of the convex ridge line 68 located in the boundary between the rake face 6a and the bottom surface 8b, the bottom surface 7b and the internal surface 81a are adjacent through the convex ridge line 68.

"The external surface 82a is in contact with the gash face 7a in the radial direction" refers to the fact that the gash face 7a and the external surface 82a are adjacent through the boundary line, and that the external surface 82a is located relatively on the peripheral side in the radial direction with respect to the gash face 7a. The boundary line between the gash face 7a and the external surface 82a is the boundary line 78 between the gash face 7a and the flute face 8a, and the boundary line 78 is continuous to the convex ridge line which is the boundary line 88 between the internal surface 81a and the external surface 82a.

"The external surface 82a is inclined with respect to the internal surface 81a from the side of the shank 2a to the side of the tip 1a, from the backward side in the rotation direction R to the forward side" refers to the fact that as shown in FIG. 8, the external surface 82a is inclined with respect to the internal surface 81a from the side of the bottom surface 8b of the flute 8 to the side of the flank face 5b of the corner R edge 5 located on the forward side in the rotation direction R, from the backward side in the rotation direction R to the forward side.

"The external surface 82a is inclined with respect to the internal surface 81a from the center side in the radial direction to the peripheral side, from the backward side in the rotation direction R to the forward side" refers to the fact that the external surface 82a is inclined with respect to the internal surface 81a from the center side in the radial direction of the multi-flute endmill 1 to the peripheral side, from the backward side in the rotation direction R to the forward side. Consequently, the external surface 82a is formed such that from the side of the bottom surface 8b of the flute 8 to the side of the flank face 5b of the corner R edge 5 located on the forward side in the rotation direction R, the surface on the side of the back surface (the surface on the backward side in the rotation direction R) of the cutting edge 3 is thinly cut off or stripped off.

The external surface 82a may be inclined with respect to the internal surface 81a from the side of the shank 2a to the side of the tip 1a, from the backward side in the rotation direction R to the forward side, and simultaneously may be inclined from the center side in the radial direction to the peripheral side, from the backward side in the rotation direction R to the forward side.

In claim 4, the flute face 8a has at least two surfaces, the internal surface 81a and the external surface 82a forming a surface different from the internal surface 81a, and thus the distance between the position of the rake face 4a of the peripheral cutting edge 4 on the side of the tip 1a and the position of the flute face 8a opposite that position on the side of the tip 1a in the peripheral direction (the rotation direction R) is increased, with the result that the volume of the space of the flute 8 is increased and the volume of the sum of the volume of the gash 7 and the volume of the chip pocket (CP) is increased. The volume of the space of the flute 8 (chip pocket) is increased, and thus it is possible to advantageously further enhance the discharge of the chips.

Effects of the Invention

The intersection between the convex ridge line in the boundary between the rake face of the end cutting edge and the rake face of the peripheral cutting edge and the convex ridge line in the boundary between the rake face of the end cutting edge and the bottom surface of the flute is moved in to the side of the rotation axis O with respect to the boundary between the flank face of the end cutting edge and the flank face of the corner R edge, so that the chips produced by the end cutting edge can be divided into those which are dropped through the gash into the flute and those which are directly dropped into the flute. Hence, the chips are unlikely to be clogged within the gash, and the effect of discharging the chips from the gash and the effect of guiding the chips from the gash to the flute are achieved. In particular, since the rake face of the peripheral cutting edge straddles from the flank face of the end cutting edge to the surface of the shank, and thus the discharge of the chips from the gash through the flute to the outside of the multi-flute endmill and the discharge speed are enhanced.

The intersection between the convex ridge line in the boundary between the rake face of the end cutting edge and the rake face of the peripheral cutting edge and the convex ridge line in the boundary between the rake face of the end cutting edge and the bottom surface of the flute is moved in to the center side in the radial direction of the shank with respect to the boundary between the flank face of the end cutting edge and the flank face of the corner R edge, and thus the flute is formed to straddle from the peripheral side in the radial direction to the center side, from the corner R edge to the end cutting edge, with the result that the effect of guiding the chips from the gash to the flute is achieved. At the same time, the rake face of the peripheral cutting edge also serves as the rake face of the corner R edge to advantageously acquire the volume of the flute, and thus it is possible to increase the volume of the flute, that is, the volume of the chip pocket (CP). Consequently, even when a difficult-to-cut alloy member is used as a member to be cut, and high-feed cutting processing is performed with the cutting depth set higher than a conventional method, it is possible to perform high-accurate and stable high-feed cutting processing, and it is possible to increase the life of the multi-flute endmill.

Furthermore, when the corner R edge is used to perform high-speed and high-feed cutting processing on a bent surface such as an impeller, the chips produced by the corner R edge can be prevented from flowing to the gash, and it is possible to immediately and smoothly discharge the chips to the outside especially along the bottom surface of the flute within the flute, and thus it is possible to reduce the clogging of the chips. Consequently, even when high-speed and high-feed cutting processing is performed on a difficult-to-cut alloy member, it is possible to prevent the cutting edge including the corner R edge from being damaged.

BEST MODE FOR CARRYING OUT THE INVENTION

Figure 1:
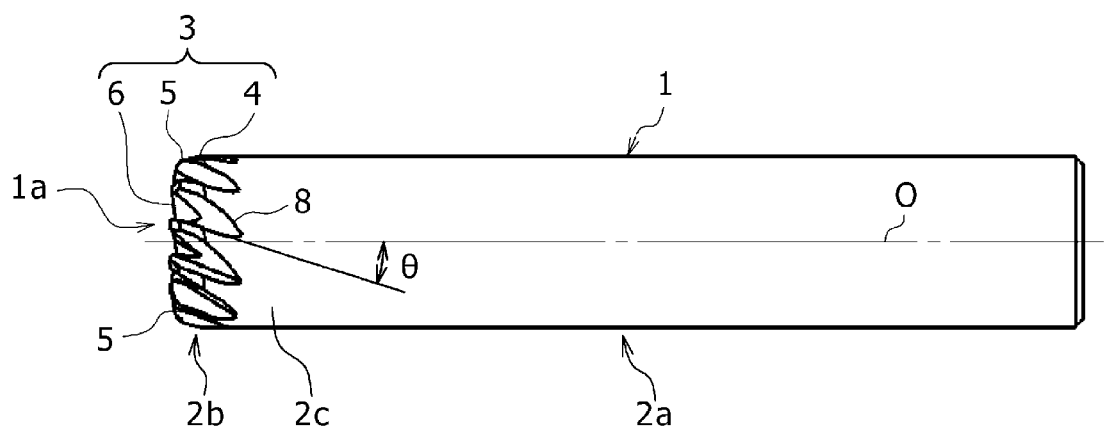
FIG. 1 A side view showing an example of the manufacturing of a multi-flute endmill according to the present invention.

An embodiment of a multi-flute endmill according to the present invention will be described below with reference to drawings.

In the following description, for example, when a member made of a Ni-based heat-resistant alloy is used as a member to be cut, "high-speed processing (high speed processing)" generally refers to processing in which a cutting speed Vc is 60 to 80 mm/min. When the cutting speed Vc is lower than 60 mm/min, the cutting property is lowered, and thus the cutting resistance is significantly increased. On the other hand, when the cutting speed Vc exceeds 80 mm/min, the cutting temperature is extremely increased, with the result that a cutting edge wears in a short period of time and chips are adhered to the cutting edge. Furthermore, since the abrasion of the member to be cut and the cutting edge is extremely increased, in particular, the wear of the flank face of the cutting edge is increased. Hence, when a member made of a Ni-based heat-resistant alloy is used as the member to be cut, the cutting speed Vc more preferably falls within a range of 65 to 80 mm/min, and further preferably falls within a range of 70 to 80 mm/min.

For example, when a member made of a Ni-based heat-resistant alloy is used as the member to be cut, the "high-feed processing" generally refers to processing in which a feed speed Vf is 1000 to 3000 mm/min. When the feed speed Vf is lower than 1000 mm/min, the processing efficiency is lowered. On the other hand, when the feed speed Vf exceeds 3000 mm/min, since the amount of chips produced is extremely increased, chip clogging is more likely to occur. The feed speed Vf more preferably falls within a range of 1500 to 3000 mm/min, and further preferably falls within a range of 1800 to 3000 mm/min.

The efficiency of substantial cutting that can be realized by one cutting edge is determined by a feed amount fz [mm/t] per edge derived from the feed speed, the number of revolutions and the number of edges, a radial direction cutting depth ae [mm] and an axial direction cutting depth ap [mm] In a conventional multi-flute endmill, it is possible to acquire a practical cutting life (life necessary to complete finish processing on an impeller with one multi-flute endmill without replacement of the tool) only at an efficiency in which the feed amount fz per edge is 0.03 to 0.06 mm/t, the radial direction cutting depth ae is 0.4 to 0.6 mm and the axial direction cutting depth ap is 0.4 to 0.6 mm. However, in the multi-flute endmill 1 of the present invention, it is possible to perform cutting processing under extremely high efficient cutting conditions in which the feed amount fz per edge is 0.08 to 0.3 mm/t, the radial direction cutting depth ae is 1 to 10 mm and the axial direction cutting depth ap is 0.8 to 2.0 mm. Hence, the advantage of the multi-flute endmill 1 of the present invention is that even under the extremely high efficient cutting conditions (high-speed processing and high-feed processing) described above, as compared with a conventional method, it is possible to acquire such a practical cutting life that long-term use can be realized.

As shown in FIG. 1, the multi-flute endmill 1 is formed with two portions, the shank 2a that has a predetermined length in the direction of the rotation axis O and that is cylindrical and a cutting edge part 2b that is formed on the side of the tip 1a which is one side in the direction of the rotation axis O of the shank 2a. The other end portion of the shank 2a is a portion that is fitted and held to a machine tool when the multi-flute endmill 1 is used to perform cutting processing by, for example, three-dimensional or five-dimensional control.

Figure 2:
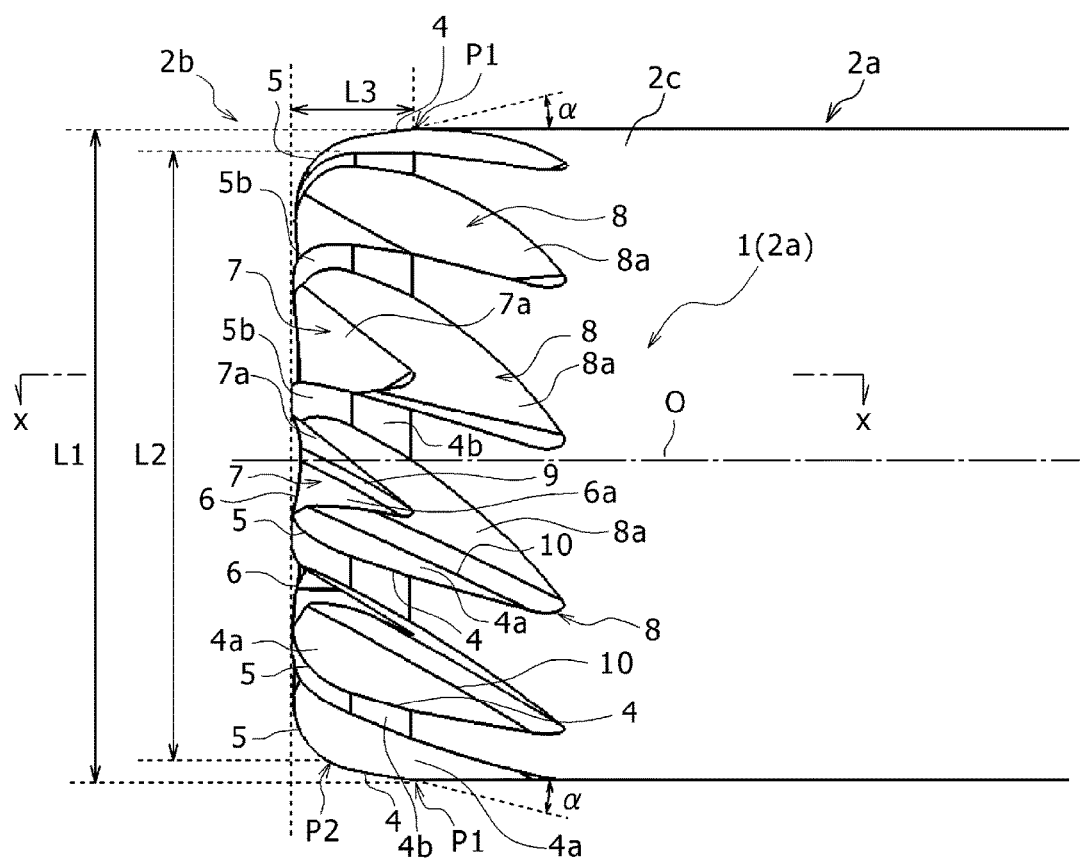
FIG. 2 An enlarged view of a cutting edge part in FIG. 1.
Figure 3:
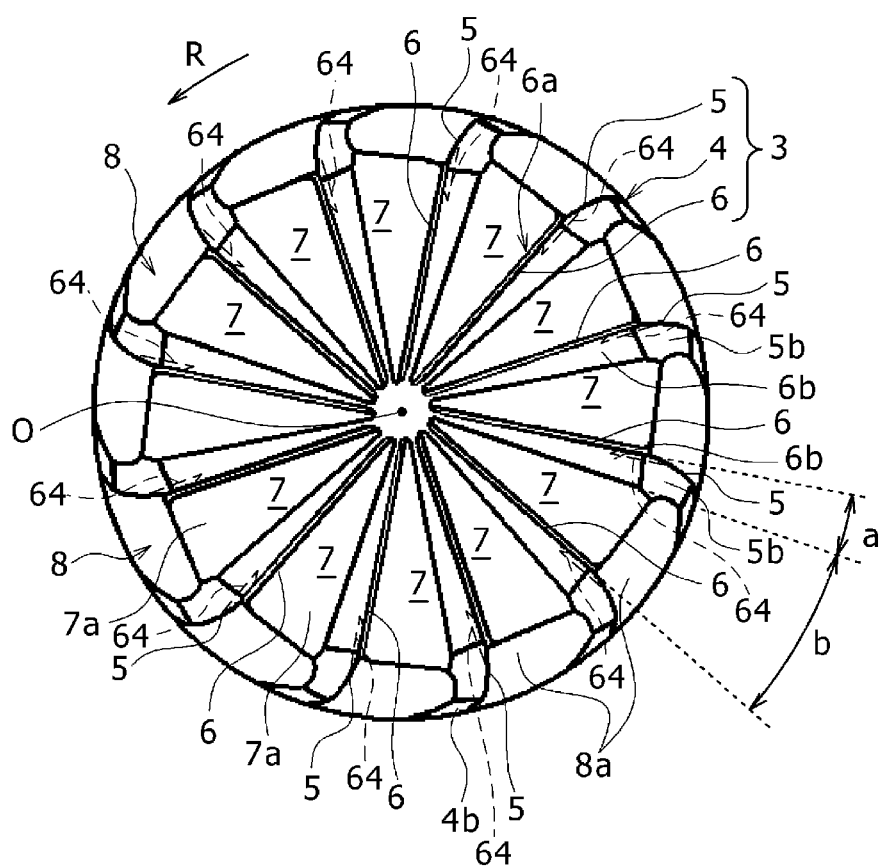
FIG. 3 An end view of the multi-flute endmill showing a state of the cutting edge part shown in FIG. 1 when the cutting edge part is seen from the side of an end surface in the direction of a rotation axis.

In the cutting edge part 2b, a plurality of cutting edges 3 formed with the peripheral cutting edge 4, the corner R edge 5 and the end cutting edge 6 are provided. An example of the configuration of the cutting edges 3 formed in the cutting edge part 2b is shown in FIGS. 2 and 3. The corner R edge 5 in the cutting edge 3 is formed to be convex on the surface side, for example, is formed substantially in the shape of an arc or is formed in the shape of a convex curve.

Since the multi-flute endmill 1 of the present invention includes a large number of cutting edges 3, even when a 3-axis or 5-axis controlled NC machine tool is used to perform finish cutting processing on the surface of an impeller made of a difficult-to-cut alloy especially with the corner R edge 5 at high speed and high-feed, it is possible to acquire satisfactory discharge of chips while enhancing the wear resistance of the corner R edge 5 and reducing the occurrence of a defect such as chipping.

Figure 5:
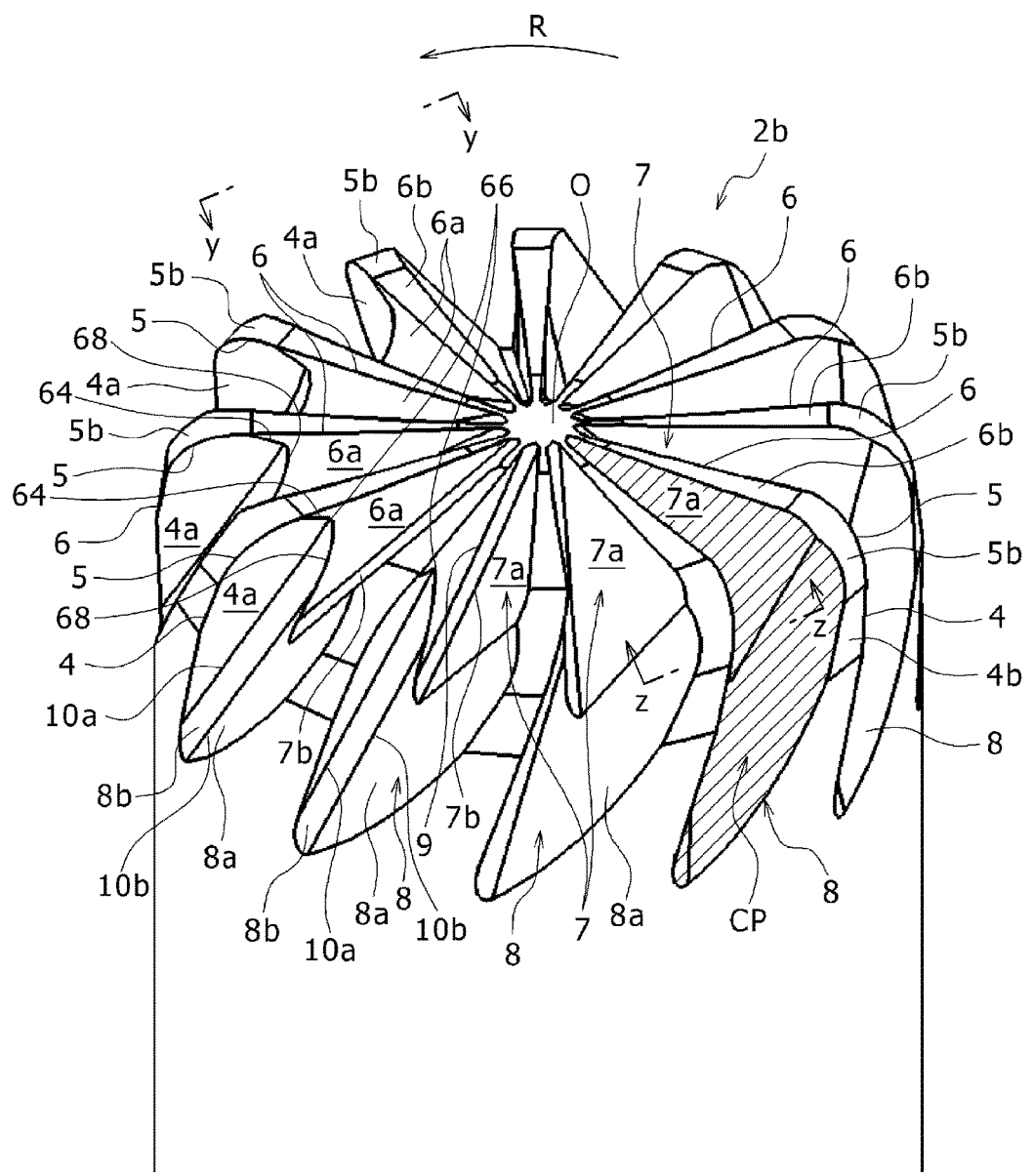
FIG. 5 A perspective view showing a state when the cutting edge part of the multi-flute endmill shown in FIG. 1 is seen from the side of the tip to the side of a shank.

As shown in FIGS. 2, 3 and 5, the cutting edge 3 is formed with the end cutting edge 6, the corner R edge 5 continuous to the end cutting edge 6 and the peripheral cutting edge 4 continuous to the corner R edge 5 from the side of the rotation axis O (the center side in the radial direction) to the peripheral side in the radial direction. The multi-flute endmill 1 mainly includes six or more but 30 or less cutting edges 3 that are spaced in the peripheral direction. The multi-flute endmill 1 shown in the figure can be regarded as one type of radius endmill in that the end cutting edge 6 is formed linearly close to the rotation axis O.

The rake face of the cutting edge 3 is formed with the rake face 6a of the end cutting edge 6, and the rake face 4a of the peripheral cutting edge 4 that is adjacent to the rake face 6a of the end cutting edge 6, that forms a rake face different from the rake face 6a of the end cutting edge 6 and that also serves as the rake face of the corner R edge 5. Each of the rake faces 6a and 4a in the cutting edge 3 may be either planar or curved.

The flank face of the cutting edge 3 is formed with the flank face 6b of the end cutting edge 6, the flank face 5b of the corner R edge 5 adjacent to the flank face 6b of the end cutting edge 6 and the flank face 4b of the peripheral cutting edge 4 adjacent to the flank face 5b of the corner R edge 5, from the center side in the radial direction to the peripheral side. L1 shown in FIG. 2 indicates the diameter (the diameter of the shank 2a) of the multi-flute endmill at the start point P1 of the formation of the peripheral cutting edge 4, L2 indicates the diameter of the multi-flute endmill at the connection portion of the peripheral cutting edge 4 and the corner R edge 5 and L3 indicates the length of the cutting edge 3. Although the flank face 5b of the corner R edge 5 is formed to be curved, the flank face 6b of the end cutting edge 6 and the flank face 4b of the peripheral cutting edge 4 may be either planar or curved.

An "arrow R" shown in FIG. 3 indicates the rotation direction R of the multi-flute endmill 1 when the cutting processing is performed, the downstream side in the direction of the "arrow R" means the forward side in the rotation direction R (the rotation direction R forward side), and the opposite side (the upstream side) means the backward side in the rotation direction R.

Between the cutting edges 3 adjacent in the rotation direction R around the rotation axis O, the gash 7 and the flute 8 are respectively formed on the center side (the side of the rotation axis O) and on the peripheral side in the radial direction. The gash 7 is formed with the rake face 6a of the end cutting edge 6, a gash face 7a opposite this rake face 6a on the forward side in the rotation direction R around the rotation axis O and a bottom surface 7b formed in the boundary between the rake face 6a of the end cutting edge 6 and the gash face 7a. The flute 8 is formed with the rake face 4a of the peripheral cutting edge 4, a flute face 8a opposite this rake face 4a on the forward side in the rotation direction R around the rotation axis O and a bottom surface 8b formed in the boundary between the rake face 4a of the peripheral cutting edge 4 and the flute face 8a. The flute 8 is a chip discharge groove for discharging chips produced by cutting processing with any cutting edge 3 to the outside of the multi-flute endmill 1, and is formed until the peripheral surface 2c of the shank 2a while communicating with the gash 7.

Figure 8:
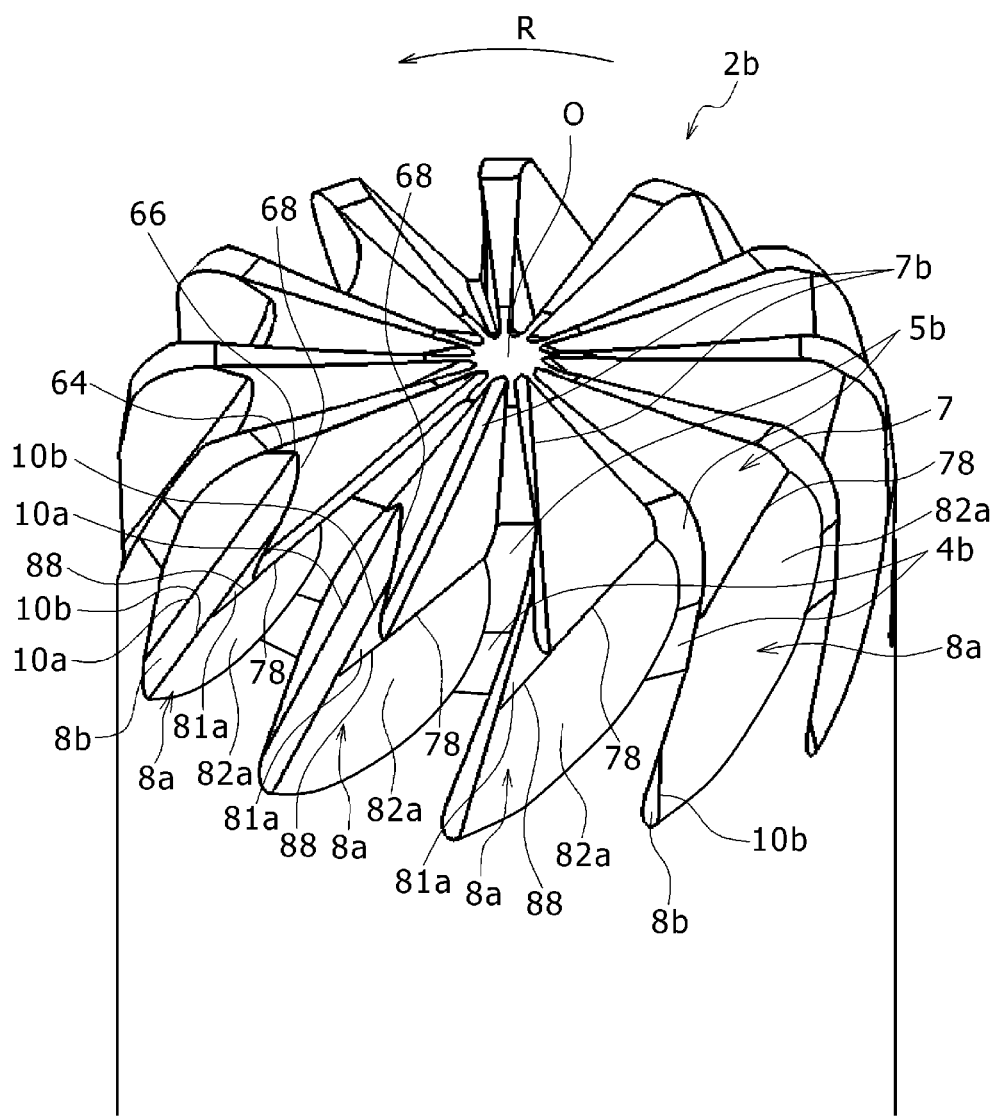
FIG. 8 A perspective view showing another example of the manufacturing of the multi-flute endmill according to the present invention when a flute face is formed with two surfaces, an internal surface and an external surface.

The cross section of the bottom surfaces 7b and 8b when the gash 7 and the flute 8 are seen in the radial direction is formed in the shape of the letter V or the letter U (curved surface) convex downwardly or in the shape of a flat surface. On both sides in the width direction (the rotation direction R) of the bottom surface 8b of the flute 8, a boundary line 10a located in the boundary with the rake face 4a of the peripheral cutting edge 4 and a boundary line 10b located in the boundary with the flute face 8a are formed. On an extension of the boundary line 10b on the center side in the radial direction (the side of the rotation axis O), a convex ridge line 68 is formed that partitions (divides) the rake face 6a of the end cutting edge 6 and the bottom surface 8b of the flute 8 and that is a boundary line between the rake face 6a of the end cutting edge 6 and the bottom surface 8b of the flute 8. Although FIGS. 5 and 8 show that the boundary lines 10a and 10b on both sides in the width direction of the bottom surface 8b are parallel to each other, the boundary lines 10a and 10b do not always need to be parallel to each other.

Figure 4:
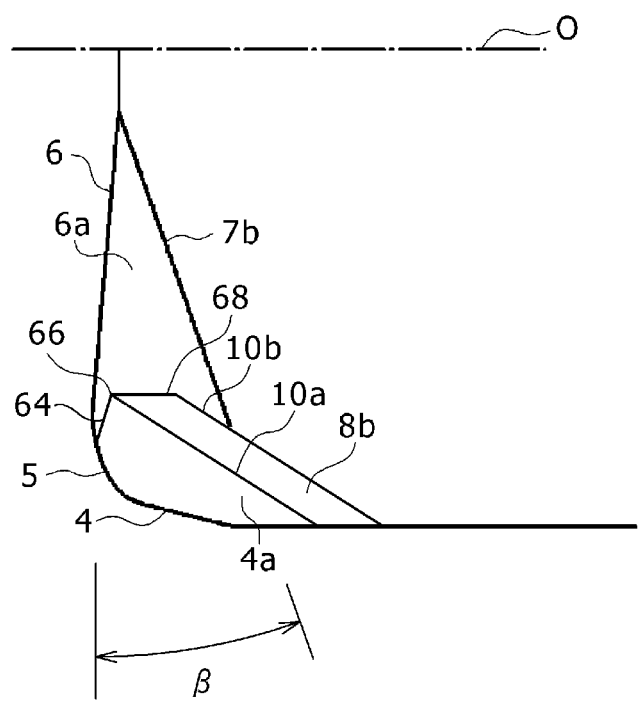
FIG. 4 A cross-sectional view taken along line x-x in FIG. 2.

FIG. 4 shows a relationship between the bottom surface 7b of the gash 7, the bottom surface 8b of the flute 8 and the boundary lines 10a and 10b. FIG. 4 shows a cross section taken along line x-x of FIG. 2, that is, shows the state of a certain gash 7 when the gash 7 is cut by a plane passing through the rotation axis O and facing the radial direction and the backward side in the rotation direction R is seen. As shown here, the bottom surface 7b of the gash 7 intersects a straight line in the radial direction at an acute angle, and the bottom surface 8b of the flute 8 intersects a straight line parallel to the rotation axis O at an acute angle. The bottom surface 8b of the flute 8 passes through the end portion of the bottom surface 7b of the gash 7 on the peripheral side in the radial direction, and is continuous in front of the end cutting edge 6. Among the boundary lines 10a and 10b on both sides in the width direction of the bottom surface 8b, a point to which the boundary line 10a on the side of the rake face 4a is continuous and which is in front of the end cutting edge 6 is an intersection 66 between a ridge line 64 and the ridge line 68. The end portion of the boundary line 10a on the side of the end cutting edge 6 is located about 0.1 to 2.0 mm in front of the end cutting edge 6. The end portion of the bottom surface 7b of the gash 7 on the peripheral side in the radial direction spatially communicates with the bottom surface 8b of the flute 8.

Each of the bottom surface 7b of the gash 7 and the bottom surface 8b of the flute 8 has a width in the rotation direction R so that the chips are unlikely to be clogged, and the width of the bottom surface 8b of the flute 8 is set larger than that of the bottom surface 7b of the gash 7 so that chips are prevented from being left within the flute 8 to which chips present within the gash 7 are discharged and thus the discharge of the chips from the flute 8 is enhanced. An angle β of the gash 7 that is an angle formed by a straight line (straight line in the radial direction) perpendicularly intersecting the rotation axis O and the bottom surface 7b of the gash 7 is preferably set within a range of 15° to 45°. When the angle β is less than 15°, the volume (V) of a chip pocket (CP) is excessively small, and chips passed to the vicinity of the rotation axis O of the multi-flute endmill 1 bite each other, with the result that the chipping of the cutting edge easily occurs. On the other hand, when the angle β exceeds 45°, the strength of the corner R edge 5 is insufficient.

Figure 6:
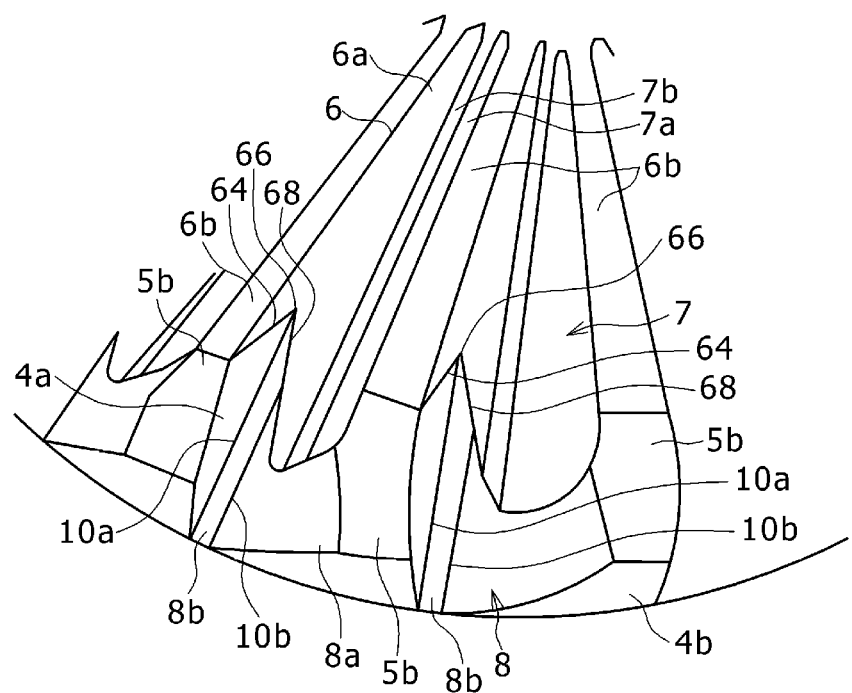
FIG. 6 A diagram taken along line y-y indicated by arrows in FIG. 5.
Figure 7:
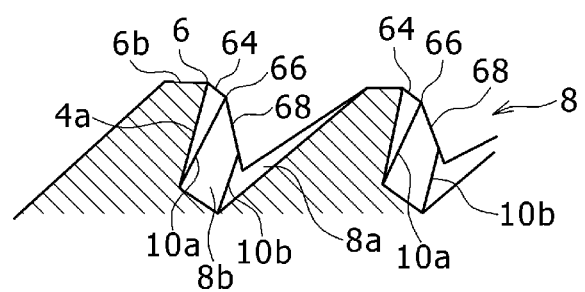
FIG. 7 (a) A cross-sectional view taken along line z-z in FIG. 5, showing a state where two ridge lines 64 and 68 and a boundary line 10a are seen beyond the cross section of the corner R edge 5; (b) A cross-sectional end view taken along line z-z in FIG. 5, indicating the present invention where there is no rake face of the corner R edge 5 by solid lines and a reference where the rake face of the corner R edge 5 is present by chain lines.
Figure 7:
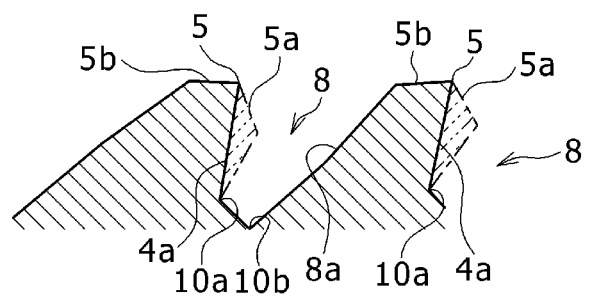

As shown in FIGS. 4 to 6 and the like, the intersection 66 between the convex ridge line 64 located in the boundary between the rake face 6a of the end cutting edge 6 and the rake face 4a of the peripheral cutting edge 4 and the convex ridge line 68 located in the boundary between the rake face 6a of the end cutting edge 6 and the bottom surface 8b of the flute 8 is moved in to the center side in the radial direction with respect to the boundary between the flank face 5b of the corner R edge 5 and the flank face 6b of the end cutting edge 6, and the ridge line 64 and the ridge line 68 are cut into the rake face 6a.

When seen from the side of the tip 1a of the multi-flute endmill 1, the peripheral cutting edge 4 of the cutting edge 3 continuous from the surface 2c of the multi-flute endmill 1 in the radial direction, the corner R edge 5 and the end cutting edge 6 form the convex ridge line, and this convex ridge line 64 is branched, as shown in FIGS. 5 and 6, from the vicinity of the boundary between the flank face 5b of the corner R edge 5 and the flank face 6b of the end cutting edge 6, to the gash face 7a opposite the rake face 6a of the end cutting edge 6. On the other hand, the convex ridge line 68 present on the extension of the boundary line 10b on the side of the flute face 8a of the flute bottom surface 8b described above extends to the side of the rake face 6a of the end cutting edge 6, meets the convex ridge line 64 within the rake face 6a of the end cutting edge 6 and intersects at the intersection 66.

The ridge line 68 present on the extension of the boundary line 10b located in the boundary between the bottom surface 8b of the flute 8 and the flute face 8a partitions (divides) the rake face 6a of the end cutting edge 6 and the bottom surface 8b of the flute 8, and thus the rake face 4a of the peripheral cutting edge 4 located on the backward side in the rotation direction R of the multi-flute endmill 1 with respect to the bottom surface 8b is also located on the backward side in the rotation direction R with respect to the rake face 6a of the end cutting edge 6. The rake face 4a of the peripheral cutting edge 4 is located on the backward side in the rotation direction R of the rake face 6a of the end cutting edge 6, and thus the chips separated from the rake face 6a (the gash 7) are more likely to be passed around to the rake face 4a (the flute 8).

Since the ridge line 68 on the extension of the boundary line 10b forming the bottom surface 8b of the flute 8 partitions the rake face 6a of the end cutting edge 6 and the bottom surface 8b of the flute 8, and the bottom surface 7b is located on the side of the gash face 7a of the rake face 6a, the bottom surface 7b of the gash 7 and the bottom surface 8b of the flute 8 are discontinuous to each other, and the bottom surface 8b of the flute 8 is located on the backward side in the rotation direction R with respect to the bottom surface 7b of the gash 7. The bottom surface 8b of the flute 8 is located on the backward side in the rotation direction R with respect to the bottom surface 7b of the gash 7, and thus as in the relationship between the rake face 4a of the peripheral cutting edge 4 and the rake face 6a of the end cutting edge 6, the chips moved through the bottom surface 7b of the gash 7 are more likely to be passed around to the side of the bottom surface 8b of the flute 8.

As described above, the boundary line 10a located in the boundary between the bottom surface 8b of the flute 8 and the rake face 4a of the peripheral cutting edge 4 also intersects the intersection 66, and the ridge line 64, the ridge line 68 and the boundary line 10a intersect each other at one point of the intersection 66. The boundary line 10a intersects the intersection 66, and thus the bottom of the groove (valley) formed with the rake face 4a of the peripheral cutting edge 4 and the bottom surface 8b of the flute 8 is formed, and the groove formed with the rake face 4a and the bottom surface 8b is cut downward, with the result that the chips present within the gash 7 are more likely to be dropped into the flute 8.

FIG. 8 shows an example of the manufacturing of the multi-flute endmill 1 when at least two surfaces are provided by forming an internal surface 81a in contact with the bottom surface 7b of the gash 7 on the backward side in the rotation direction R and an external surface 82a which is a surface different from the internal surface 81a and which is in contact with the gash face 7a in the radial direction. The external surface 82a is inclined with respect to the internal surface 81a from the backward side in the rotation direction R to the forward side, either from the side of the shank 2a in the multi-flute endmill 1 to the side of the tip 1a or from the center side in the radial direction to the peripheral side.

Since the gash face 7a and the flute face 8a form different faces, though as shown in FIG. 8, a boundary line 78 appears as a convex ridge line between the gash face 7a and the flute face 8a, the boundary line 78 is continuous to the side of the bottom surface 8b of the flute 8 so as to be a boundary line 88 that partitions (divides) the internal surface 81a and the external surface 82a. The boundary line 78 passes through the end portion on the peripheral side in the radial direction of the bottom surface 7b of the gash 7 and the end portion of the convex ridge line 68, and intersects the boundary line 10b on the side of the flute face 8a of the bottom surface 8b of the flute 8 as the boundary line 88.

Although as a result of the inclination of the external surface 82a with respect to the internal surface 81a, the outline on the peripheral side in the radial direction of the external surface 82a intersecting the flank face 5b of the corner R edge 5 located on the forward side in the rotation direction R of the external surface 82a and the flank face 4b of the peripheral cutting edge 4 is slightly displaced to the forward side in the rotation direction R as compared with the example of FIG. 5, the external surface 82a is inclined from the center side in the radial direction to the peripheral side, and the outline of the external surface 82a close to the surface 2c intersects the flank faces 5b and 4b, with the result that the rigidity of the cutting edge 3 (edge end) is not affected.

In the example of FIG. 8, the external surface 82a is inclined with respect to the internal surface 81a from the backward side in the rotation direction R to the forward side, either from the side of the shank 2a to the side of the tip 1a or from the side of the rotation axis O to the peripheral side in the radial direction, and thus when the multi-flute endmill 1 is seen from the side of the tip 1a in the direction of the rotation axis O, the width of the flute 8 in the peripheral direction is extended from the center side in the radial direction to the peripheral side, and the volume of the flute 8 is increased, with the result that the ability to discharge the chips present within the gash 7 is advantageously enhanced, as compared with the example of FIG. 5.

The "angle a" shown in FIG. 3 is the angle of the width of the flank face 6b of the end cutting edge 6, and indicates an angle formed by the end cutting edge 6 and the ridge line (the boundary line between the gash face 7a and the flank face 6b) on the backward side in the rotation direction R of the flank face 6b. The "angle b" is the "open angle of the gash 7", and indicate an angle formed by the ridge line on the backward side in the rotation direction R of the flank face 6b and the end cutting edge 6 adjacent to the backward side in the rotation direction R of the end cutting edge 6. These angles a and b are related to the volume of the chip pocket (CP) of the multi-flute endmill 1.

When as shown in FIG. 3, the multi-flute endmill 1 is seen from the side of the tip 1a in the direction of the rotation axis O, and it is assumed that the angle formed by the end cutting edge 6 and the ridge line on the backward side in the rotation direction R of the flank face 6b of the end cutting edge 6 is the "angle a (the angle of the width of the flank face 6b of the end cutting edge 6)" and that the angle formed by the ridge line on the backward side in the rotation direction R of the flank face 6b of the end cutting edge 6 and the end cutting edge 6 adjacent to the backward side in the rotation direction R of the end cutting edge 6 is the "angle b (the open angle of the gash 7)", the end cutting edge 6 and the flank face 6b of the end cutting edge are preferably formed such that the angle b is 1.5 or more but 3 or less times as great as the angle a.

The "angle a" is set according to the diameter of the edge of the multi-flute endmill 1 and the number of cutting edges 3. For example, when the number of edges is 8, the angle a is set with a range of 10 to 30°, when the number of edges is 10, the angle a is set with a range of 8 to 24° and when the number of edges is 12, the angle a is set with a range of 6 to 20°. The "angle b" is determined by subtracting the value of the "angle a" from a value obtained by dividing 360° by the number of edges. For example, when the number of edges is 8, the angle b is set within a range of 35 to 15°, when the number of edges is 10, the angle b is set within a range of 28 to 12° and when the number of edges is 12, the angle b is set within a range of 24 to 10°.

As long as the rigidity of the end cutting edge 6 and the corner R edge 5 in particular among the cutting edges 3 is not degraded, the setting is made such that the volume of the gash 7 is ensured. For example, when the diameter of the edge is 30 mm, and the number of cutting edges 3 is 10, the angle a is set at about 12°, and the open angle b of the gash 7 is set at about 24°.

The reason why the angle b is preferably set so as to be 1.5 or more but 3 or less times as great as the angle a of the width of the flank face 6b of the end cutting edge is as follows. Although when the angle b is set so as to be less than 1.5 times as great as the angle a, it is possible to enhance the rigidity of the edge end of the cutting edge 3, the chip pocket (CP) is decreased when high-efficient processing in which the cutting and feed speeds are increased is performed. In other words, since the angle b is decreased, it is impossible to efficiently carry chips to the flute 8, and the chips easily bite each other. On the other hand, when the angle b is 3 or more times as great as the angle a, the strength of the edge end of the end cutting edge 6 and the corner R edge 5 is insufficient, and in particular, the corner R edge 5, which is the main cutting edge 3 in the processing of the impeller, is more likely to be chipped. Hence, the angle b is preferably set so as to be 1.5 or more but 3 or less times as great as the angle a.

As shown in FIG. 2, the peripheral cutting edge 4 is extended from point P1 displaced from the side of the tip 1a of the multi-flute endmill 1 to the side of the peripheral surface of the shank 2a to the side of the tip 1a, and is formed at an angle α with respect to the rotation axis O. The point P1 is the start point of the peripheral cutting edge 4 formed from the peripheral surface of the shank 2a to the side of the tip 1a of the multi-flute endmill 1. In the following description, the point P1 is referred to as the "start point of the peripheral cutting edge 4", and the angle α is referred to as the "inclination angle α" of the peripheral cutting edge 4.

The inclination angle α of the peripheral cutting edge 4 preferably falls within a range of 0 to 10°, and more preferably falls within a range of 5 to 10°. When the inclination angle α is less than 5°, the peripheral cutting edge 4 may be bitten (excessively cut) in the cutting processing on the concave portion of the surface of a curved impeller. When the inclination angle α exceeds 10°, the diameter of the cutting edge part 2b on the side of the tip 1a of the multi-flute endmill 1 is excessively decreased, and thus the length of the cutting edges such as the corner R edge 5 and the end cutting edge 6 is reduced, with the result that the strength of the edge end of the cutting edge 3 is lowered and the volume of the chip pocket (CP) is lowered. When the inclination angle α is set to be equal to or more than 0° but less than 5° (for example, 0°), the multi-flute endmill 1 is held in a 5-axis NC machine tool and the cutting processing is performed on the impeller, it is necessary to control the inclination of the multi-flute endmill 1 and the impeller itself. In this way, even when the inclination angle α is set at 0° in the multi-flute endmill, as in the multi-flute endmill where the inclination angle is set within a range of 5 to 10°, it is possible to obtain the advantageous effects of the present invention.

The peripheral cutting edge 4 is inclined at, for example, the inclination angle α with respect to the rotation axis O at the start point P1 of the formation of the peripheral cutting edge 4, and is continuous to the corner R edge 5 at a point P2 which is the termination end portion of the peripheral cutting edge 4. The point P2 is a boundary point between the peripheral cutting edge 4 and the corner R edge 5. When the multi-flute endmill 1 is seen from the side surface (in the peripheral direction), the corner R edge 5 is formed in the shape of a curved line having a constant curvature or a changing curvature from the boundary point P2 between the peripheral cutting edge 4 and the corner R edge 5 to the side of the tip 1a of the multi-flute endmill 1. The peripheral cutting edge 4 is twisted with respect to the direction of the rotation axis O at a helix angle θ of, for example, 20° (see FIG. 1).

Figure 10:
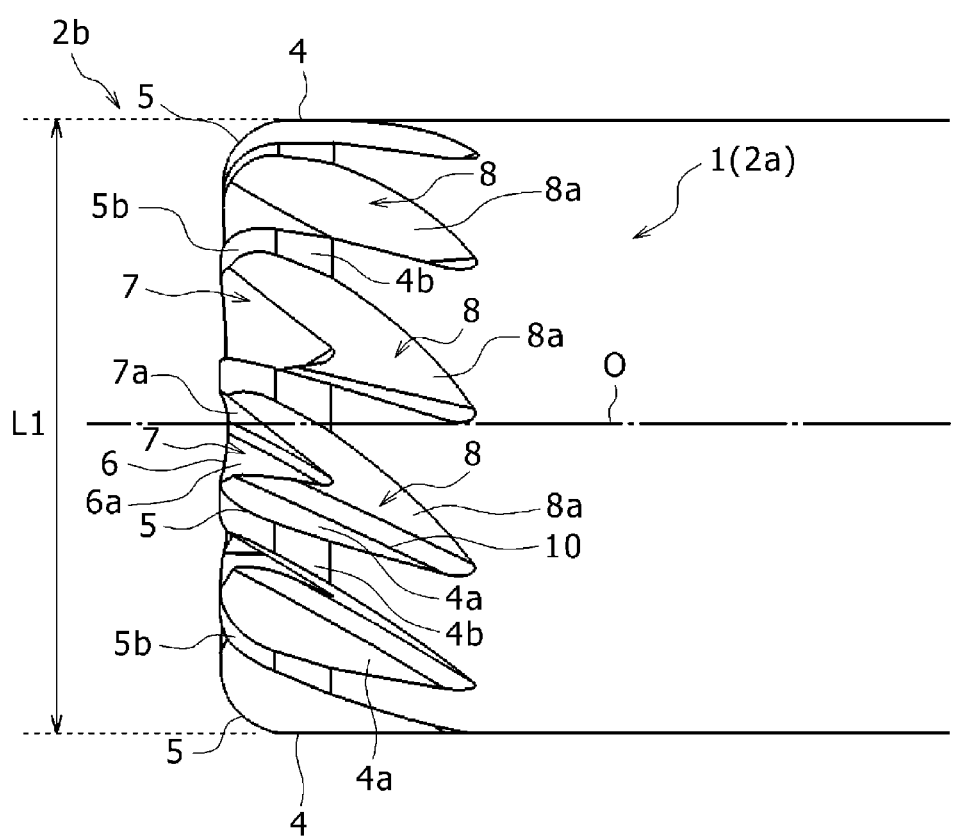
FIG. 10 A side view showing an example of the manufacturing of the multi-flute endmill according to the present invention when the outline of a peripheral cutting edge is formed parallel to the rotation axis O.
Figure 11:
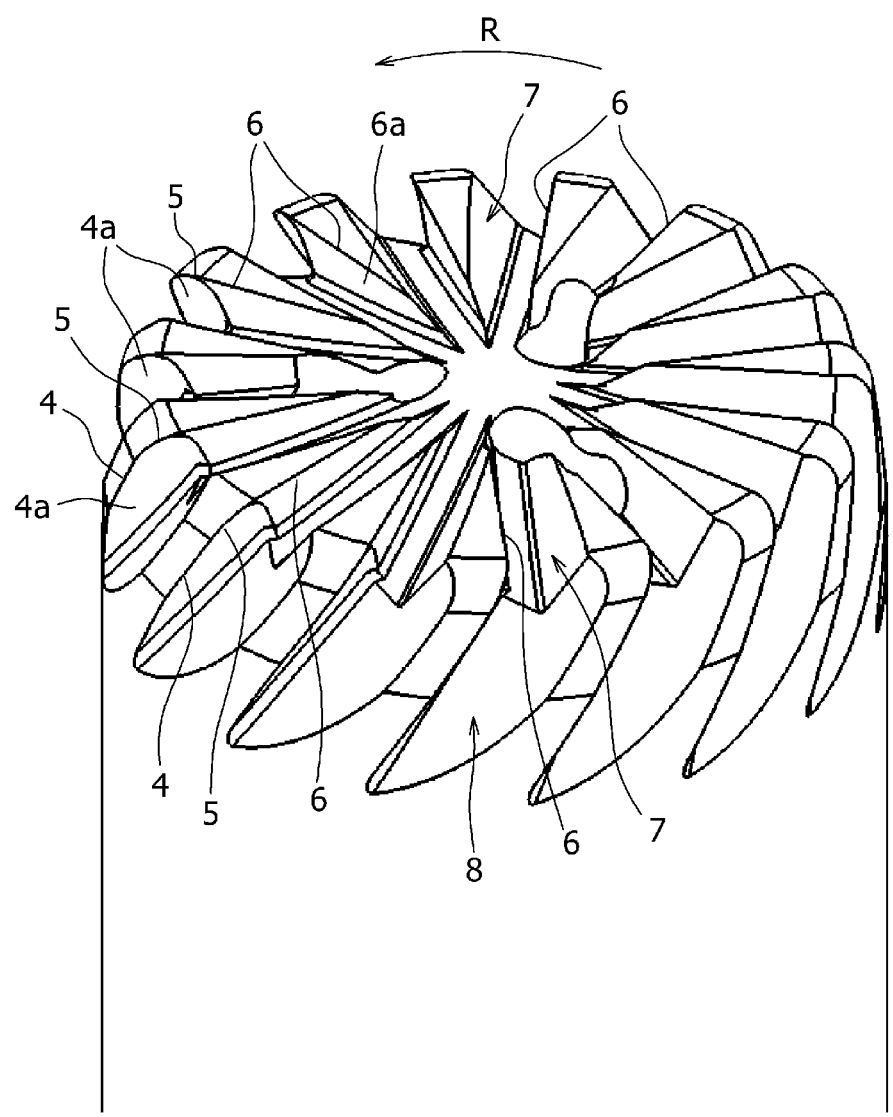
FIG. 11 A perspective view showing a state where an endmill disclosed in patent document 1 is seen from the side of a tip to the side of a shank.
Figure 12:
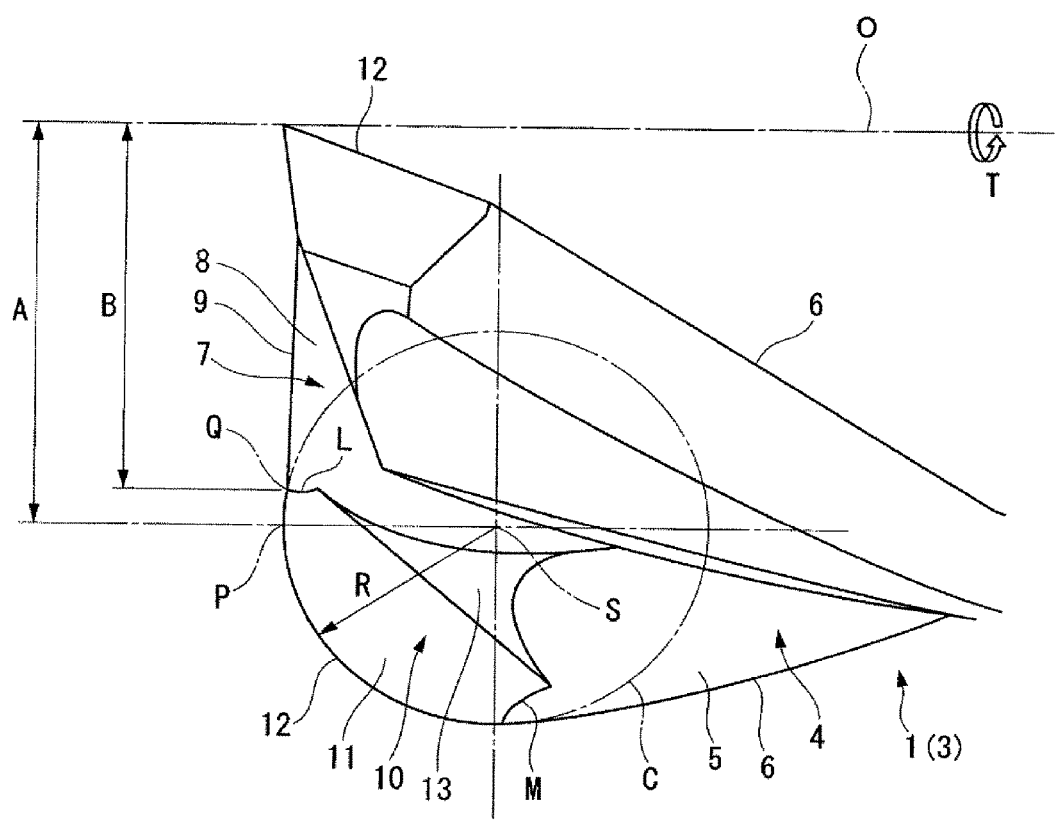
FIG. 12 A partially enlarged side view (FIG. 2 in patent document 2) of the endmill disclosed in patent document 2.

Although in FIG. 2, the peripheral cutting edge 4 is inclined at the inclination angle α with respect to the direction of the rotation axis O, the case where as shown in FIG. 10, the peripheral cutting edge 4 is not inclined with respect to the direction of the rotation axis O is also present. The example of FIG. 10 is the case where the peripheral cutting edge 4 is set parallel to the rotation axis O.

As shown in FIG. 4, the end cutting edge 6 continuous to the other end portion of the corner R edge 5 is inclined so as to extend from the side of the tip 1a to the side of the shank 2a, from the peripheral side in the radial direction on the side of the tip 1a of the multi-flute endmill 1 to the center side (the side of the rotation axis O), and is formed linearly up to the vicinity of the rotation axis O.

As described above, the sum of the volume of the space forming the gash 7 and the volume of the space forming the flute 8 is referred to as the chip pocket (CP). When the diameter of the shank 2a and the number of edges are constant, as the volume of the chip pocket is increased, the effect of discharging chips is more enhanced. As indicated by oblique lines in FIG. 5, the chip pocket per edge refers to a space formed between the cutting edges 3 adjacent in the rotation direction R. The number of chip pockets is equal to the number of cutting edges 3 in the multi-flute endmill 1.

It is appropriate that the volume (V) of the chip pocket (CP) per edge is set within a range equal to or more than 25 mm³ but equal to or less than 120 mm³ when at the start point P1 of the formation of the peripheral cutting edge 4 shown in FIG. 2, the edge diameter L1 (the diameter of the shank 2a) of the multi-flute endmill 1 is 10 to 30 mm, and the number of cutting edges 3 is 6 to 30. The volume (V) of the chip pocket (CP) is the volume of a material removed by the formation of the gash 7 and the flute 8 on the unprocessed multi-flute endmill 1 before the formation of the gash 7 and the flute 8.

As described above, the multi-flute endmill 1 includes 6 to 30 cutting edges 3. It is appropriate that when the edge diameter L1 of the multi-flute endmill 1 at the start point P1 of the formation of the peripheral cutting edge 4 is set at 30 mm, the upper limit of the number of cutting edges 3 is about 30. The reason for this is as follows.

Although when in the multi-flute endmill 1 of the present invention, the cutting processing is performed on the impeller or the like, it is possible to perform the high-feed processing in which the cutting depths ae and ap in the axial direction and the radial direction are increased, in order to further perform high-efficient processing, it is necessary to increase the feed speed Vf. In order to increase the feed speed Vf, it is necessary to increase the feed amount fz [mm/t] per edge or the cutting speed Vc [m/min]. However, in particular, when the cutting processing is performed on a difficult-to-cut alloy member, the temperature disadvantageously increases at the time of the cutting. The temperature at the time of the cutting increases as the number of revolutions (the cutting speed Vc of the tool) of the main shaft is increased, and since the increase in the cutting temperature damages a hard film coating the surface of the endmill, and the life of the endmill is reduced, it is impossible to significantly increase the cutting speed. For example, when the member to be cut is a Ni-based heat-resistant alloy member, there is a limitation of about Vc=80 m/min. When the multi-flute endmill 1 is used to perform the cutting processing, since it is particularly important to "perform the cutting processing without producing a high cutting heat", it is necessary to consider such a factor.

Since when the feed amount fz per edge is excessively increased, a burden placed on the edge end of the endmill is increased, it is impossible to significantly increase the feed amount fz per edge. In particular, when the feed amount fz per edge exceeds 0.3 mm/t, this phenomenon becomes remarkable. Hence, in order to realize high-efficient processing, it is necessary to increase the number of cutting edges 3, and unless a multi-flute endmill having at least 6 edges is used, it is difficult to realize high-efficient processing as compared with a conventional endmill having 2 or 4 edges. On the other hand, when the number of edges exceeds 30, since the chip pocket (CP) is excessively reduced, chips are easily clogged around the rotation axis O or within the gash 7, and the clogged chips bite each other, and thus the cutting edge is easily chipped.

When high-efficient and high-feed cutting processing is performed on an impeller made of a Ni-based heat-resistant alloy or the like, using the corner R edge 5 of the multi-flute endmill 1 of the present invention, with a 3-axis or 5-axis NC controlled processing machine, cutting conditions are set such that for example, the axial direction cutting depth ap falls within a range of 0.8 to 2.0 mm (preferably a range of 1.0 to 1.5 mm), and the radial direction cutting depth ae falls within a range of 1 to 10 mm (preferably a range of 1 to 5 mm). The feed amount fz per edge is set so as to fall within a range of 0.08 to 0.3 mm/t (preferably a range of 0.1 to 0.2 mm/t), and the number of edges is increased, and thus it is possible to significantly enhance an overall cutting processing efficiency until the completion of the impeller finish processing as compared with a conventional method.

With consideration given to what has been described above, it is appropriate that the number of cutting edges 3 is set at least 6 or more and that its upper limit is set at 30 or less. When the axial direction cutting depth ap, the radial direction cutting depth ae and the feed amount fz per edge are less than the setting ranges described above, it is impossible to recognize any difference from conventional high-feed processing. On the other hand, when the setting ranges of the axial direction cutting depth ap, the radial direction cutting depth ae and the feed amount fz per edge exceed the ranges described above, a remarkable decrease in the life of the tool occurs, and it cannot be practically used.

Figure 9:
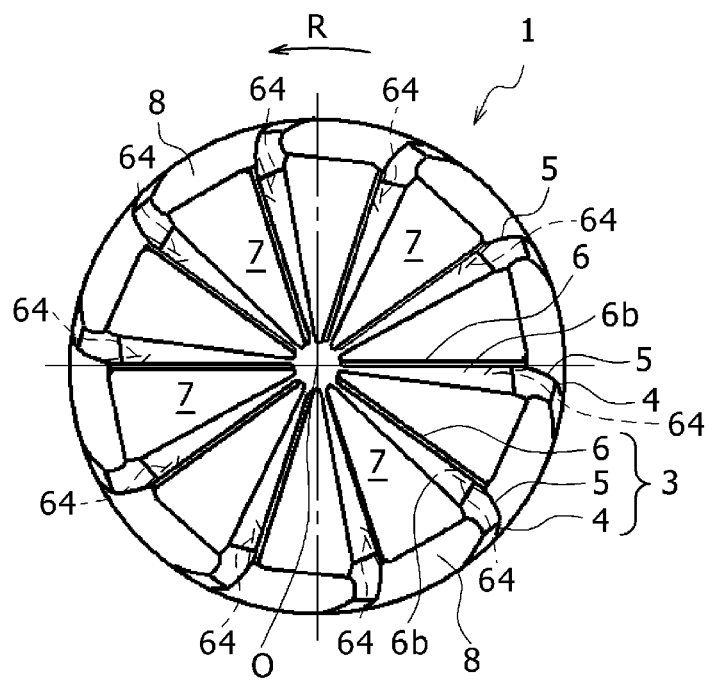
FIG. 9 (a) An end view showing a state where when the number of cutting edges is 10, the cutting edge part of the multi-flute endmill according to the present invention is seen from the side of the end surface (the tip); (b) An end view showing a state where when the number of cutting edges is 15, the cutting edge part of the multi-flute endmill according to the present invention is seen from the side of the end surface.
Figure 9:
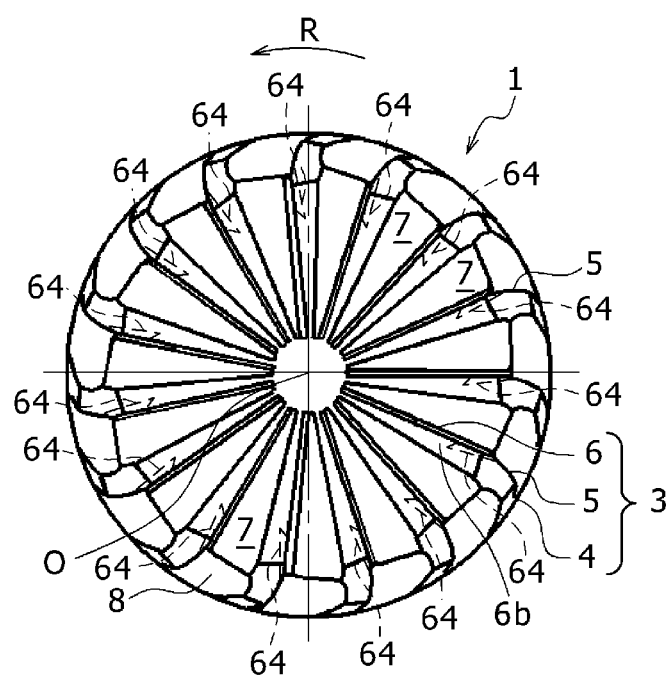

FIG. 9(a) shows a state where when the number of cutting edges 3 is 10, the end surface of the cutting edge part 2b of the multi-flute endmill 1 is seen in the direction of the rotation axis O. FIG. 9(b) shows a state where when the number of cutting edges 3 is 15, the end surface of the cutting edge part 2b of the multi-flute endmill 1 is seen.

In order to fit the multi-flute endmill 1 of the present invention to a 3-axis or 5-axis NC controlled processing machine and to perform finish processing highly efficiently on a curved surface such as an impeller, it is preferable to set the edge diameter L1 of the multi-flute endmill at the start point P1 of the formation of the peripheral cutting edge 4 shown in FIG. 2 to fall within a range of 10 to 30 mm. The reason for this is as follows.

When the edge diameter L1 falls within a range of 10 to 30 mm, even if the number of edges is set at 6 or more but 30 or less for performing cutting processing highly efficiently, the volume (V) of the chip pocket (CP) can be set at 25 mm³ or more but 120 mm³ or less. However, when the edge diameter L1 is less than 10 mm, if the number of cutting edges 3 is increased, it is difficult to acquire 25 mm³ or more of the volume (V) of the chip pocket (CP). On the other hand, when the edge diameter L1 is more than 30 mm, if the volume (V) of the chip pocket (CP) is set at 25 mm³ or more but 120 mm³ or less, the open angle b (see FIG. 3) of the gash is extremely narrow, with the result that chips may be prevented from being discharged. The more appropriate range of the edge diameter L1 is a range of 15 to 25 mm. The edge diameter L3 is preferably set within a range of 30 to 60% of the edge diameter L1 of the multi-flute endmill 1 at the start point P of the formation of the peripheral cutting edge 4. When the edge diameter L3 exceeds 60% of the edge diameter L1, chatter occurs in the high-feed cutting processing.

In the high-feed and high-efficient cutting processing on the impeller using the multi-flute endmill 1 of the present invention, the volume (V) of the chip pocket (CP) per edge is set at 25 mm³ or more but 120 mm³ or less, and thus, even when the high-feed and high-efficient cutting processing is performed, it is possible to smoothly discharge produced chips. The reason for this is as follows.

When the volume (V) of the chip pocket (CP) is less than 25 mm³, in the high-efficient cutting processing, chips produced mainly by the corner R edge 5 are prevented from being discharged smoothly, and thus the chips are clogged, with the result that the cutting edge 3 is more likely to be damaged or chipped. On the other hand, when the volume (V) of the chip pocket (CP) exceeds 120 mm³, if the number of edges is increased to provide a multi-flute endmill, the overall volume of the tool itself, that is, the volume of a portion of the cutting edge part 2b made of a cemented carbide is reduced, and thus it is difficult to ensure the rigidity of the cutting edge part 2b, with the result that the cutting edge 3 is more likely to be chipped by an impact at the time of the cutting. When the number of edges is reduced to prevent the overall volume of the tool itself from being lowered, since the comprehensive feed speed Vf [mm/min] until the completion of the finish processing is lowered, it is impossible to realize the high-efficient cutting processing that is an object of the present invention. Hence, in the present invention, the appropriate range of the volume (V) of the chip pocket (CP) is 25 mm$^3$ to 100 mm$^3$, and the more appropriate range is 45 mm$^3$ to 70 mm$^3$.

When the volume (V) of the chip pocket (CP) per edge is set at 25 mm$^3$ or more but 120 mm$^3$ or less, the chip pocket (CP) is preferably formed such that the gash 7 and the flute 8 present on the forward side in the rotation direction R of the corner R edge 5 are maximized. Specifically, the open angle b of the gash 7 is set so as to be maximized such that the rigidity of the multi-flute endmill 1 is prevented from being degraded. Furthermore, the setting is performed such that the length of the rake face 4a of the peripheral cutting edge 4 in the radial direction is maximized and the distance from the peripheral cutting edge 4 and the corner R edge 5 to the boundary line 10a is maximized.

As the volume (V) of the chip pocket (CP), a value obtained by the following method is used. A non-contact three-dimensional measurement system (product name: RexcanIII made by Solutionix) was used to sequentially perform a three-dimensional measurement on the surface portion (including the cutting edge part) of a prototyped multi-flute endmill, and thus a three-dimensional CAD model of the multi-flute endmill of the present invention was produced. From this three-dimensional CAD model, the volume of a space portion obtained by adding the gash 7 formed between the adjacent cutting edges 3 and the flute 8 continuous to the gash 7 was determined as the volume (V) of the chip pocket (CP) per edge.

Although not shown in the figure, in the multi-flute endmill 1 of the present invention, coolant holes for supplying a coolant (cooling liquid) may be formed during the cutting processing on the member to be cut. One or a plurality of coolant holes are bored from the side of the tip 1a of the multi-flute endmill 1. The coolant holes are formed in order to cool the cutting edges 3 during the cutting processing, to smoothly discharge chips produced by the cutting processing from the gash 7 formed between the cutting edges 3 through the flute 8 to the outside and to prevent chips from being adhered (welded) to the cutting edges 3.

It is appropriate that at least three coolant holes are equally spaced in the peripheral direction of the multi-flute endmill and are formed in the gash face 7a or the flank face 6b of the end cutting edge 6. During the cutting processing, the coolant is supplied from a 3-axis or 5-axis NC controlled processing machine and is sprayed through a plurality of coolant holes.

(Method of Manufacturing the Multi-Flute Endmill)

An example of a method of manufacturing the multi-flute endmill 1 of the present invention will then be described below. Although not particularly limited, the base member of the multi-flute endmill 1 is preferably formed of the powder of a WC-based cemented carbide having WC (tungsten carbide) as a main ingredient. The base member made of the WC-based cemented carbide is formed as the multi-flute endmill 1 having a constant number of cutting edges 3 in the cutting edge part 2b by sintering, at a predetermined temperature, a molded member obtained by molding raw material powder with a mold and by cutting the obtained sintered member with a cutting processing device using a diamond wheel or the like. Here, as necessary, the coolant holes are bored along the direction of the rotation axis O within the multi-flute endmill 1 (the shank 2a).

For example, the processing on the cutting edge part 2b without being processed is performed in the following procedure with a NC controlled cutting processing device using a laminate diamond wheel or the like.

(1) First, the rake face 4a of the peripheral cutting edge 4 forming one wall surface of the flute 8 shown in FIG. 5, the other flute face 8a opposite this rake face 4a and the bottom surface 8b between the both are formed. Here, the peripheral cutting edge 4 serving also as the corner R edge is formed. The flute face 8a is formed, with respect to the gash face 7a, so as to form an inclination surface extending from the forward side in the rotation direction R to the backward side, from the side of the tip 1a of the multi-flute endmill 1 to the side of the shank 2a or so as to form an inclination surface extending from the backward side in the rotation direction R to the forward side, from the center side in the radial direction to the peripheral side.

(2) Then, the rake face 6a of the end cutting edge 6, the gash face 7a and the bottom surface 7b between the both, which constitute the gash 7, are formed by the cutting processing. Here, the end cutting edge 6 is also formed. In this cutting processing, the rake face 6a of the end cutting edge 6 is processed so as to be located on the forward side in the rotation direction R with respect to the rake face 4a of the peripheral cutting edge 4. In this way, in the boundary between the rake face 4a of the peripheral cutting edge 4 and the rake face 6a of the end cutting edge 6, the convex ridge line 64 and the convex ridge line 68 are formed, and the bottom surface 8b of the flute 8 and the boundary lines 10a and 10b on both sides in the width direction are formed. The rake face 6a of the end cutting edge 6 is formed, with respect to the rake face 4a of the peripheral cutting edge 4, so as to form an inclination surface extending from the backward side in the rotation direction R to the forward side, from the side of the tip 1a of the multi-flute endmill 1 to the side of the shank 2a, with the result that the rigidity of the cutting edge 3 including the end cutting edge 6 is ensured.

After the formation of the rake face 4a of the peripheral cutting edge 4, the cutting processing is performed on the gash face 7a to form the bottom surface 7b of the gash 7. In this way, as shown in FIG. 5, in a state where the bottom surface 8b of the flute 8 and the bottom surface 7b of the gash 7 are discontinuous to each other, the bottom surface 8b of the flute 8 is formed so as to be located on the backward side in the rotation direction R with respect to the bottom surface 7b of the gash. Then, the flank faces 6b, 5b and 4b are formed on the cutting edges 3, and the processing on the cutting edge part 2b is completed.

(3) After the completion of the processing on the cutting edge part 2b, at least the entire surface of the cutting edge part 2b of the surface of the base member formed to have predetermined dimensions is coated with a hard film having a thickness of a few μm (for example, about 3 μm) by, for example, a PVD method. Although not particularly limited, as the hard film, an AlCrN film or an AlCr-based hard film is suitable.

INDUSTRIAL APPLICABILITY

The multi-flute endmill 1 of the present invention is used as a cutting tool effective for being fitted to a 3-axis or 5-axis machining center or the like and performing cutting processing on, for example, a curved surface of an impeller made of a Ni-based heat-resistant alloy member with high speed and high feed.

EXPLANATION OF THE REFERENCE NUMERALS

1: multi-flute endmill, 1a: tip of multi-flute endmill,
2a: shank, 2b: cutting edge part, 2c: surface,
3: cutting edge,
4: peripheral cutting edge, 4a: rake face of peripheral cutting edge, 4b: flank face of peripheral cutting edge,
5: corner R edge, 5a: rake face of corner R edge, 5b: flank face of corner R edge,
6: end cutting edge, 6a: rake face of end cutting edge, 6b: flank face of end cutting edge,
64: convex ridge line (boundary line between rake face 6a of end cutting edge and rake face 4a of peripheral cutting edge),
68: convex ridge line (boundary line between rake face 6a of end cutting edge and bottom surface 8b of flute),
66: intersection between convex ridge line 64 and convex ridge line 68,
7: gash, 7a: gash face, 7b: bottom surface of gash,
78: boundary line between gash face and flute face,
8: flute, 8a: flute face, 81a: internal surface, 82a: external surface, 8b: bottom surface of flute,
88: boundary line between internal surface and external surface,
10a: boundary line, 10b: boundary line,
O: rotation axis,
R: rotation direction,
a: angle of width of flank face of end cutting edge,
b: open angle of gash,
L1: edge diameter of multi-flute endmill at peripheral cutting edge formation starting point,
L2: edge diameter of multi-flute endmill at connecting part of peripheral cutting edge and corner R edge,
L3: edge length,
P1: peripheral cutting edge formation starting point,
P2: connecting part of peripheral cutting edge and corner R edge,
α: inclination angle of peripheral cutting edge,
β: gash angle,
θ: helix angle

The invention claimed is:

1. A multi-flute endmill comprising:
a cutting edge part that has a plurality of cutting edges, each formed with an end cutting edge which is formed at a tip of a shank from a side of a rotation axis O to a peripheral side in a radial direction of the shank, a corner R edge continuous to the end cutting edge and a peripheral cutting edge continuous to the corner R edge; and
a gash and a flute that are respectively formed on a center side and the peripheral side in the radial direction between the adjacent cutting edges in a rotation direction R around the rotation axis O,
wherein a rake face of the cutting edge is formed, from the center side to the peripheral side in the radial direction, with:
a rake face of the end cutting edge; and
a rake face of the peripheral cutting edge that is adjacent to the rake face of the end cutting edge, that forms a face different from the rake face of the end cutting edge and that also serves as a rake face of the corner R edge, a flank face of the cutting edge is formed, from the center side to the peripheral side in the radial direction, with:
a flank face of the end cutting edge;
a flank face of the corner R edge adjacent to the flank face of the bottom end cutting edge; and
a flank face of the peripheral cutting edge adjacent to the flank face of the corner R edge,
the flute is formed with:
the rake face of the peripheral cutting edge;
a flute face opposite the rake face of the peripheral cutting edge on a forward side in the rotation direction R; and
a bottom surface formed in a boundary between the rake face of the peripheral cutting edge and the flute face; and
an intersection between a convex ridge line located in a boundary between the rake face of the end cutting edge and the rake face of the peripheral cutting edge and a convex ridge line located in a boundary between the rake face of the end cutting edge and a bottom surface of the flute is moved into the center side of the radial direction than a boundary between a flank face of the corner R edge and a flank face of the end cutting edge.

2. The multi-flute endmill according to claim 1, wherein a width of the bottom surface of the flute is greater than a width of a bottom surface formed in a boundary between a rake face of the end cutting edge forming the gash and a gash face opposite the rake face of the end cutting edge on the forward side in the rotation direction R.

3. The multi-flute endmill according to claim 1, wherein a boundary line forming a concave ridge line on a side of the peripheral cutting edge of the bottom surface of the flute passes through the intersection between the convex ridge line located in the boundary between the rake face of the end cutting edge and the rake face of the peripheral cutting edge and the convex ridge line located in the boundary between the rake face of the end cutting edge and the bottom surface of the flute.

4. The multi-flute endmill according to claim 1, wherein the flute face has at least two surfaces, an internal surface that is in contact with a bottom surface of the gash on a backward side in the rotation direction R and an external surface that forms a surface different from the internal surface and that is in contact with the gash face in the radial direction opposite the rake face of the end cutting edge forming the gash on the forward side in the rotation direction R, and
the external surface is inclined, from a side of the shank to a side of the tip, with respect to the internal surface, from the backward side to the forward side in the rotation direction R, or is inclined, from the center side to the peripheral side in the radial direction, with respect to the internal surface, from the backward side to the forward side in the rotation direction R.

5. The multi-flute endmill according to claim 2, wherein a boundary line forming a concave ridge line on a side of the peripheral cutting edge of the bottom surface of the flute passes through the intersection between the convex ridge line located in the boundary between the rake face of the end cutting edge and the rake face of the peripheral cutting edge and the convex ridge line located in the boundary between the rake face of the end cutting edge and the bottom surface of the flute.

6. The multi-flute endmill according to claim 2, wherein the flute face has at least two surfaces, an internal surface that is in contact with a bottom surface of the gash on a backward side in the rotation direction R and an external surface that forms a surface different from the internal surface and that is in contact with the gash face in the radial direction opposite the rake face of the end cutting edge forming the gash on the forward side in the rotation direction R, and the external surface is inclined from a side of the shank to a side of the tip with respect to the internal surface from the backward side to the forward side in the rotation direction R, or is inclined from the center side to the peripheral side in the radial direction with respect to the internal surface from the backward side to the forward side in the rotation direction R.

7. The multi-flute endmill according to claim 3, wherein the flute face has at least two surfaces, an internal surface that is in contact with a bottom surface of the gash on a backward side in the rotation direction R and an external surface that forms a surface different from the internal surface and that is in contact with the gash face in the radial direction opposite the rake face of the end cutting edge forming the gash on the forward side in the rotation direction R, and the external surface is inclined from a side of the shank to a side of the tip with respect to the internal surface from the backward side to the forward side in the rotation direction R, or is inclined from the center side to the peripheral side in the radial direction with respect to the internal surface from the backward side to the forward side in the rotation direction R.

8. The multi-flute endmill according to claim 5, wherein the flute face has at least two surfaces, an internal surface that is in contact with a bottom surface of the gash on a backward side in the rotation direction R and an external surface that forms a surface different from the internal surface and that is in contact with the gash face in the radial direction opposite the rake face of the end cutting edge forming the gash on the forward side in the rotation direction R, and the external surface is inclined from a side of the shank to a side of the tip with respect to the internal surface from the backward side to the forward side in the rotation direction R, or is inclined from the center side to the peripheral side in the radial direction with respect to the internal surface from the backward side to the forward side in the rotation direction R.

* * * * *

UNITED STATES PATENT AND TRADEMARK OFFICE
CERTIFICATE OF CORRECTION

PATENT NO.        : 9,555,486 B2                                          Page 1 of 1
APPLICATION NO.   : 14/416710
DATED             : January 31, 2017
INVENTOR(S)       : Makoto Baba et al.

It is certified that error appears in the above-identified patent and that said Letters Patent is hereby corrected as shown below:

In the Claims

Column 25, Line 4, Claim 6:
Insert -- to -- after "according".

Column 25, Line 20, Claim 7:
Insert -- to -- after "according".

Column 26, Line 10, Claim 8:
Insert -- to -- after "according".

Signed and Sealed this
Second Day of May, 2017

Michelle K. Lee
*Director of the United States Patent and Trademark Office*